US012804612B2

(12) United States Patent
Yuan et al.

(10) Patent No.: US 12,804,612 B2
(45) Date of Patent: Nov. 17, 2026

(54) SOUNDING REFERENCE SIGNAL (SRS) RESOURCE SET CONFIGURATION FOR ASYMMETRIC PANELS

(71) Applicant: QUALCOMM INCORPORATED, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 347 days.

(21) Appl. No.: 18/558,398

(22) PCT Filed: Jul. 2, 2021

(86) PCT No.: PCT/CN2021/104208

§ 371 (c)(1),
(2) Date: Nov. 1, 2023

(87) PCT Pub. No.: WO2023/272711

PCT Pub. Date: Jan. 5, 2023

(65) Prior Publication Data

US 2024/0224236 A1 Jul. 4, 2024

(51) Int. Cl.
*H04W 72/02* (2009.01)
*H04B 7/0404* (2017.01)
*H04L 5/00* (2006.01)

(52) U.S. Cl.
CPC .......... *H04W 72/02* (2013.01); *H04B 7/0404* (2013.01); *H04L 5/0051* (2013.01); *H04L 5/0053* (2013.01)

(58) Field of Classification Search
CPC ...... H04W 72/02; H04W 8/24; H04B 7/0404; H04B 7/0691; H04L 5/0051; H04L 5/0053; H04L 5/0091; H04L 5/0023
(Continued)

(56) References Cited

U.S. PATENT DOCUMENTS

2020/0106168 A1* 4/2020 Hakola .................. H04B 7/088
2021/0036895 A1 2/2021 Huang et al.
(Continued)

FOREIGN PATENT DOCUMENTS

WO WO-2020121528 A1 6/2020
WO WO-2020143018 A1 7/2020

OTHER PUBLICATIONS

International Search Report and Written Opinion—PCT/CN2021/104208—ISA/EPO—Mar. 30, 2022.
(Continued)

*Primary Examiner* — Rownak Islam
(74) *Attorney, Agent, or Firm* — Holland & Hart LLP

(57) ABSTRACT

This disclosure provides systems, methods and apparatus, including computer programs encoded on computer storage media, for a sounding reference signal (SRS) resource set configuration to facilitate uplink panel selection between a set of asymmetric panels of a user equipment (UE), each panel of the set of asymmetric panels of the UE being associated with a different number of SRS ports. In one aspect, the UE may receive such an SRS resource set configuration indicating one or more SRS resource sets and SRS resources of the one or more SRS resource sets may be associated with different numbers of SRS ports or a dynamically configurable number of SRS ports. The UE may receive control signaling from a base station (BS) and the control signaling may indicate a panel for an uplink transmission from the UE by indicating an SRS resource, an SRS resource set, or a number of SRS ports.

30 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0166468 | A1* | 5/2022 | Go | H04B 7/06956 |
| 2022/0166587 | A1* | 5/2022 | Go | H04L 1/1864 |
| 2023/0155655 | A1* | 5/2023 | Zhang | H04B 7/0691 375/262 |
| 2024/0057071 | A1* | 2/2024 | Sun | H04W 72/1268 |

OTHER PUBLICATIONS

LG Electronics: "Discussion on Multi-Beam Based Operations and Enhancements", R1-1812582, 3GPP TSG RAN WG1 Meeting #95, Spokane, USA, Nov. 12-16, 2018, pp. 1-10.

Mediatek Inc: "Enhancement on Multi-beam Operation", 3GPP TSG RAN WG1 #104b-e, R1-2102675, 3rd Generation Partnership Project, Mobile Competence Centre, 650, Route Des Lucioles, F-06921 Sophia-Antipolis Cedex, France vol. RAN WG1, No. e-Meeting, Apr. 12, 2021-Apr. 20, 2021, 34 Pages, Apr. 7, 2021, XP052177680, section 2.4.1.

Moderator (Samsung): "Moderator Summary for Multi-beam Enhancement: Round 4", 3GPP TSG RAN WG1 #105-e, R1-2106285, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 14 Pages, May 27, 2021, XP052015798, section 2.4.

Supplementary European Search Report—EP21947661—Search Authority—The Hague—Jan. 29, 2025.

Mediatek Inc.: "Enhancement on Multi-beam Operation", 3GPP TSG RAN WG1 #104b-e, R1-2102675, e-Meeting, Apr. 12, 2021-Apr. 20, 2021, 35 Pages, Section 2.3 to 2.4.

Taiwan Search Report—TW111121013—TIPO—Jul. 20, 2025.

* cited by examiner

SOUNDING REFERENCE SIGNAL (SRS) RESOURCE SET CONFIGURATION FOR ASYMMETRIC PANELS

CROSS REFERENCE

The present Application is a 371 national stage filing of International PCT Application No. PCT/CN2021/104208 by Yuan et al. entitled "SOUNDING REFERENCE SIGNAL (SRS) RESOURCE SET CONFIGURATION FOR ASYMMETRIC PANELS," filed Jul. 2, 2021, which is assigned to the assignee hereof, and which is expressly incorporated by reference in its entirety herein.

TECHNICAL FIELD

This disclosure relates to wireless communications, including sounding reference signal (SRS) resource set configuration for asymmetric panels.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may support a number of panels for an uplink transmission.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of one or more sounding reference signal (SRS) resource sets associated with an SRS for an uplink transmission, receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, selecting, from the set of asymmetric panels of the UE, the first panel in accordance with the control signaling, and performing the uplink transmission via the first panel.

Another innovative aspect of the subject matter described in this disclosure can be implemented in an apparatus for wireless communications at a UE. The apparatus may include a first interface, a second interface, and a processing system. The first interface may be configured to obtain an indication of one or more SRS resource sets associated with an SRS for an uplink transmission; and obtain control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The processing system may be configured to select, from the set of asymmetric panels of the UE, the first panel in accordance with the control signaling. The first interface or the second interface may be configured to output the uplink transmission via the first panel.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive an indication of one or more SRS resource sets associated with an SRS for an uplink transmission, receive control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, select, from the set of asymmetric panels of the UE, the first panel in accordance with the control signaling, and perform the uplink transmission via the first panel.

Another innovative aspect of the subject matter described in this disclosure can be implemented in another apparatus for wireless communications at a UE. The apparatus may include means for receiving an indication of one or more SRS resource sets associated with an SRS for an uplink transmission, means for receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, means for selecting, from the set of asymmetric panels of the UE, the first panel in accordance with the control signaling, and means for performing the uplink transmission via the first panel.

Another innovative aspect of the subject matter described in this disclosure can be implemented in a non-transitory computer-readable medium storing code for wireless communications at a UE. The code may include instructions executable by a processor to receive an indication of one or more SRS resource sets associated with an SRS for an uplink transmission, receive control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, select, from the set of asymmetric panels of the UE, the first panel in accordance with the control signaling, and perform the uplink transmission via the first panel.

In some examples of the method, apparatuses, and non-transitory computer-readable medium described herein, receiving the indication of the one or more SRS resource sets associated with the SRS for the uplink transmission may include operations, features, means, or instructions for receiving an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

In some examples of the method, apparatuses, and non-transitory computer-readable medium described herein, receiving the indication of the one or more SRS resource sets associated with the SRS for the uplink transmission may include operations, features, means, or instructions for receiving an indication of a single SRS resource set associated with the SRS for the uplink transmission, the single SRS resource set including multiple SRS resources, where the multiple SRS resources in the single SRS resource set may be configurable with a dynamic number of SRS ports.

One innovative aspect of the subject matter described in this disclosure can be implemented in a method for wireless communications at a network entity. The method may include transmitting, to a UE, an indication of one or more SRS resource sets associated with an SRS for an uplink transmission, transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, and receiving, from the UE, the uplink transmission via the first panel of the UE.

Another innovative aspect of the subject matter described in this disclosure can be implemented in an apparatus for wireless communications at a network entity. The apparatus may include a first interface, a second interface, and a processing system. The first interface may be configured to output, to a UE, an indication of one or more SRS resource sets associated with an SRS for an uplink transmission and output, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The first interface or the second interface may be configured to obtain, from the UE, the uplink transmission via the first panel of the UE.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, an indication of one or more SRS resource sets associated with an SRS for an uplink transmission, transmit, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, and receive, from the UE, the uplink transmission via the first panel of the UE.

Another innovative aspect of the subject matter described in this disclosure can be implemented in another apparatus for wireless communications at a network entity. The apparatus may include means for transmitting, to a UE, an indication of one or more SRS resource sets associated with an SRS for an uplink transmission, means for transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, and means for receiving, from the UE, the uplink transmission via the first panel of the UE.

Another innovative aspect of the subject matter described in this disclosure can be implemented in a non-transitory computer-readable medium storing code for wireless communications at a network entity. The code may include instructions executable by a processor to transmit, to a UE, an indication of one or more SRS resource sets associated with an SRS for an uplink transmission, transmit, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports, and receive, from the UE, the uplink transmission via the first panel of the UE.

In some examples of the method, apparatuses, and non-transitory computer-readable medium described herein, transmitting the indication of the one or more SRS resource sets associated with the SRS for the uplink transmission may include operations, features, means, or instructions for transmitting an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

In some examples of the method, apparatuses, and non-transitory computer-readable medium described herein, transmitting the indication of the one or more SRS resource sets associated with the SRS for the uplink transmission may include operations, features, means, or instructions for transmitting an indication of a single SRS resource set associated with the SRS for the uplink transmission, the single SRS resource set including multiple SRS resources, where the multiple SRS resources in the single SRS resource set may be configurable with a dynamic number of SRS ports.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
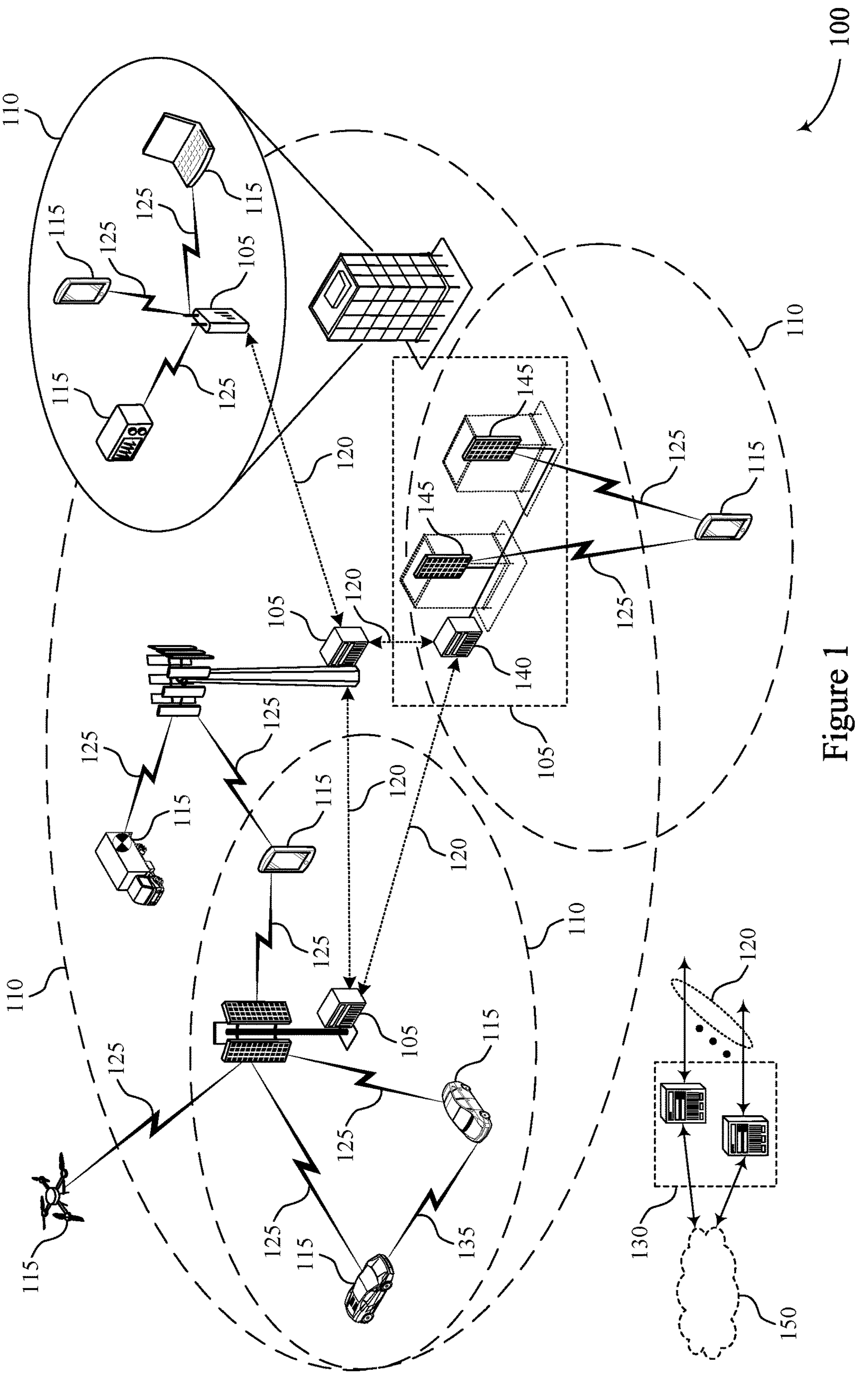
FIG. 1 illustrates an example wireless communications system that supports sounding reference signal (SRS) resource set configuration for asymmetric panels.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a user equipment (UE) may support or feature multiple panels (such as multiple antenna panels) and the UE may select one or more panels to use for an uplink transmission to a network entity, such as a base station (BS). In some examples, the multiple panels that the UE supports may include symmetric panels such that each panel of the multiple panels has a same number of antenna ports. In such examples, the UE may use a single sounding reference signal (SRS) resource set (associated with a single number of antenna or SRS ports) for codebook-based multiple-input multiple-output (MIMO) transmissions. In some other examples the panels that the UE supports may include multiple asymmetric panels such that each panel of the multiple panels has a different number of antenna ports. In such examples, the UE may lack an SRS resource set configuration that is compatible with panels having different numbers of antenna ports, which may make it difficult for the UE to select an uplink panel for a codebook-based uplink transmission.

In some implementations of the present disclosure, the UE may receive an SRS resource set configuration of one or more SRS resource sets associated with an uplink transmission such that SRS resources of the one or more SRS resource sets may be configurable to have different quantities of SRS ports. In some examples, the UE may receive a configuration of two SRS resource sets for an uplink transmission such that SRS resources of the two SRS resources are associated with different quantities of SRS ports and such that the different quantities of SRS ports correspond to different panels of the UE. In such examples, the UE may receive control signaling indicating one of the two SRS resource sets and the UE may select a panel for the uplink transmission accordance with which of the two SRS resource sets is indicated (such as in accordance with a number of SRS ports of the indicated SRS resource set).

In some other examples, the UE may receive a configuration of one SRS resource set for an uplink transmission such that the number of SRS ports for SRS resources within the one SRS resource set may be dynamically updated. For example, a first number of SRS ports may correspond to a first uplink panel and a second number of SRS ports may correspond to a second uplink panel and the UE may receive an indication of either or both of the first number of SRS ports or the second number of SRS ports. The UE may assign SRS resources of the SRS resource set with either the first number of SRS ports or the second number of SRS ports in accordance with the indication. In such examples, the UE may receive control signaling indicating an SRS resource associated with either the first number of SRS ports or the second number of SRS ports and the UE may select a panel for the uplink transmission in accordance with which of the first number of SRS ports or the second number of SRS ports is associated with the indicated SRS resource.

Particular implementations of the subject matter described in this disclosure can be implemented to realize one or more of the following potential advantages. For example, as a result of receiving a configuration of the one or more SRS resource sets that include SRS resources that may be configurable to be associated with different numbers of SRS ports, the UE and the BS may leverage the different numbers of SRS ports associated with different SRS resources (or different SRS resource sets) to indicate a panel that the UE is to use for an uplink transmission, which may result in more dynamic panel selection in examples in which the UE supports multiple asymmetric panels. Further, the UE and the BS may experience greater flexibility in terms of a quantity of SRS ports as a result of such dynamic panel selection between multiple asymmetric panels, which may support more accurate and reliable beam management procedures as the UE may dynamically select a quantity of SRS ports and operate a panel corresponding to the dynamically selected quantity of SRS ports. Additionally, such more accurate and reliable beam management procedures may provide for higher data rates, greater system capacity, and greater spectral efficiency, among other examples.

FIG. 1 illustrates an example wireless communications system 100 that supports SRS resource set configuration for asymmetric panels. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max}-N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some examples, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, MIMO communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by one or more components of a BS 105 multiple times in different directions. For example, the BS 105 may transmit a signal according to different beamforming weight sets associated with different directions of transmission. Transmissions in different beam directions may be used to identify (for example, by a transmitting device, such as one or more components of a BS 105, or by a receiving device, such as a UE 115) a beam direction for later transmission or reception by the BS 105.

Some signals, such as data signals associated with a particular receiving device, may be transmitted by one or more components of a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by one or more components of a BS 105 or a UE 115) may be performed using multiple beam directions, and the device may use a combination of digital precoding or radio frequency beamforming to generate a combined beam for transmission (for example, from one or more components of a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

In some systems, such as the wireless communications system 100, a UE 115 may support a number of panels and the UE 115 may use one or more of the number of panels for uplink transmissions to one or more components of a BS 105. As such, the panels of the UE 115 may be equivalently referred to herein as uplink panels. In some examples, the number of panels that the UE 115 supports may be symmetric panels and, in such examples, the UE 115 may receive a configuration of a single SRS resource set including SRS resources associated with a same number of SRS ports for uplink transmissions (such as for codebook-based uplink MIMO transmissions). In some other examples, the number of panels that the UE 115 supports may be asymmetric panels and, accordingly, each panel may have a different number of ports. For example, each panel may have a different maximum number of supportable demodulation reference signal (DMRS) ports or MIMO layers for a physical uplink shared channel (PUSCH) transmission. Such ports may be equivalently referred to herein as antenna ports and each antenna port may correspond to or may otherwise be associated with an SRS port.

In such examples in which the UE 115 supports a number of asymmetric panels, the UE 115 may receive an indication of one or more SRS resource sets associated with an SRS for an uplink transmission and may receive control signaling indicating, for the uplink transmission, a first panel of the number of asymmetric panels of the UE 115. In some examples, the control signaling may indicate the first panel in accordance with a respective number of SRS ports associated with each panel of the number of asymmetric panels and the one or more SRS resource sets. For example, SRS resources of the one or more SRS resource sets may be associated with different numbers of SRS ports or a variable number of SRS ports and the control signaling may indicate the first panel as a result of indicating an SRS resource (or an SRS resource set) that is associated with a number of SRS ports corresponding to the first panel. In other words, the control signaling may indicate an SRS resource (or an SRS resource set) that is associated with a same number of SRS ports as the first panel. Accordingly, the UE 115 may select, from the number of asymmetric panels of the UE, the first panel and may perform an uplink transmission via the first panel. For example, the UE 115 may transmit uplink data and an uplink SRS over a physical uplink shared channel (PUSCH) via the first panel.

Figure 2:
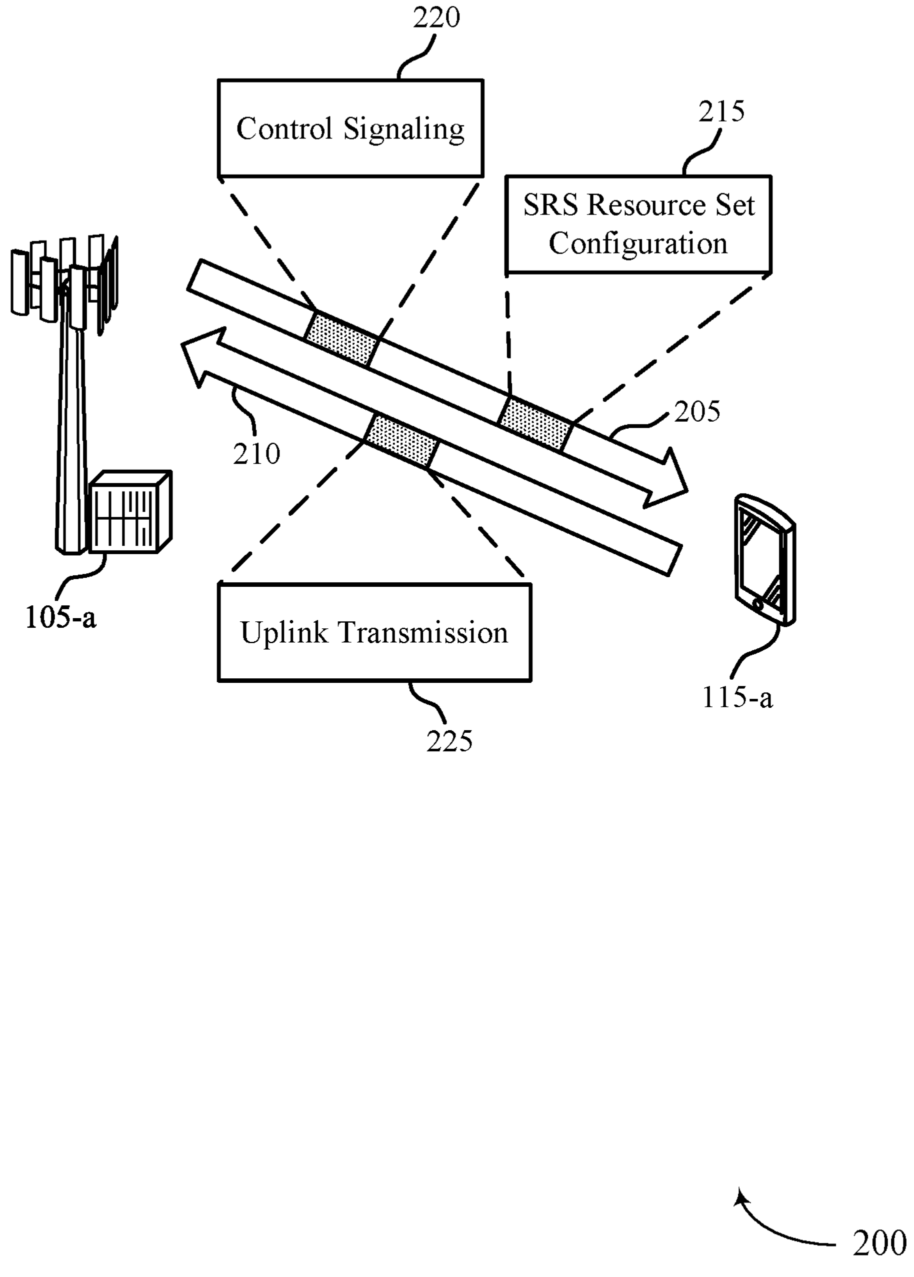
FIGS. 2 and 3 illustrate example signaling diagrams that support SRS resource set configuration for asymmetric panels.

FIG. 2 illustrates an example signaling diagram 200 that supports SRS resource set configuration for asymmetric panels. The signaling diagram 200 may implement or be implemented to realize aspects of the wireless communications system 100. For example, the signaling diagram 200 may include a UE 115-*a* and a BS 105-*a*, which may be examples of corresponding devices described herein, including with reference to FIG. 1. In some examples, the UE 115-*a* may support a set (of multiple) asymmetric panels and, as part of a panel selection for an uplink transmission 225 via a communication link 210, may receive an SRS resource set configuration 215 and control signaling 220 via a communication link 205 indicating a panel of the set of asymmetric panels in accordance with a respective number of SRS ports associated with each panel of the set of asymmetric panels and one or more SRS resource sets provided by the SRS resource set configuration 215.

For example, the UE 115-*a* may support a number of asymmetric panels (asymmetric uplink panels) and the UE 115-*a* may use the SRS resource set configuration 215 to facilitate uplink panel selection for an uplink transmission from the UE 115-*a*. In such examples, for instance, if the UE 115-*a* has asymmetric panels for uplink transmission, to facilitate uplink panel selection for codebook-based PUSCH transmissions, the SRS resource set configuration 215 for a codebook-based uplink MIMO transmission may feature one or more SRS resource sets including SRS resources that may potentially correspond to different panels of the number of asymmetric panels. For example, the one or more SRS resource sets may include a first set of SRS resources where each SRS resource in the first set is associated with a first number of SRS ports and a second set of SRS resources where each SRS resource in the second set is associated with a second number of SRS ports or the one or more SRS resource sets may include SRS resources that may be dynamically updated with different numbers of SRS ports (such that the SRS resources may be associated with either the first number of SRS ports or the second number of SRS ports).

In some examples, the first number of SRS ports may correspond to a first panel of the set of asymmetric panels and the second number of SRS ports may correspond to a second panel of the set of asymmetric panels. For example, the first panel may be associated with 4 SRS ports and the second panel may be associated with 2 SRS ports. As such, the UE 115-*a* may use the SRS resource set configuration 215 to facilitate uplink panel selection, as one or more components of the BS 105-*a* may provide signaling indicating an SRS resource (or an SRS resource set) and the UE 115-*a* may select a panel from the set of asymmetric panels of the UE 115-*a* using the number of SRS ports associated with the indicated SRS resource (or the indicated SRS resource set). A quantity of the one or more SRS resource sets for which the UE 115-*a* may receive a configuration and the control signaling 220 that one or more components of the BS 105-*a* may transmit to the UE 115-*a* to indicate a panel of the set of asymmetric panels of the UE 115-*a* may vary across different implementation decisions, as described in more detail herein.

In some implementations, for example, the UE 115-*a* may receive a configuration of two SRS resource sets (for a codebook-based uplink MIMO transmission) via the SRS resource set configuration 215 and the two SRS resource sets may each be associated with a different number of ports (such as SRS ports). In other words, SRS resources of the different SRS resource sets may have different numbers of SRS ports. For example, the SRS resource set configuration 215 may indicate a first SRS resource set where each SRS resource in the first set is associated with the first number of SRS ports and a second SRS resource set where each SRS resource in the second set is associated with the second number of SRS ports. In some examples, whether one or both of the two SRS resource sets are active or valid SRS resource sets may depend on whether the UE 115-*a* is capable of operating a single active uplink panel or capable of operating two active uplink panels. Alternatively, the UE 115-*a* may receive a configuration of two SRS resource sets (for a codebook-based uplink MIMO transmission) via the SRS resource set configuration 215 and the two SRS resource sets may correspond to the same SRS resource set ID. The first SRS resource set may use a full set of SRS ports in each SRS resource in the set and the second SRS resource set may use a subset of SRS ports in each SRS resource in the set.

For example, if the UE 115-*a* is capable of a single active uplink panel, one SRS resource set of the two configured SRS resource sets is valid to be triggered for SRS transmission and SRS resource indicator (SRI) indication for a PUSCH transmission. In such examples, the UE 115-*a* may refrain from transmitting an SRS in the invalid SRS resource set regardless of whether that SRS resource set is triggered and may select one of the two SRS resource sets as the valid resource set according to the control signaling 220 from the one or more components of the BS 105-*a*. For example, the UE 115-*a* may select or otherwise identify a first SRS resource set as a valid resource set if the UE 115-*a* receives signaling activating a transmission configuration indicator (TCI) state associated with the first SRS resource set, if the UE 115-*a* receives medium access control (MAC) control element (MAC-CE) signaling activating (such as explicitly activating) the first SRS resource set, or if the UE 115-*a* receives MAC-CE signaling activating (such as explicitly activating) an SRI field or an SRS resource set selection field in downlink control information (DCI) corresponding to the first SRS resource set, or any combination thereof. For example, different SRI fields or different SRS resource set selection fields may correspond to different SRS resource sets (such as one of the first SRS resource set or the second SRS resource set), and the BS 105-*a* may activate an SRS resource set as a valid SRS resource set by activating a corresponding SRI field or SRS resource set selection field. As such, the control signaling 220 may include any one or more of such TCI state activation signaling or MAC-CE signaling.

The UE 115-*a*, as a result of receiving the control signaling 220 indicating which of the two configured SRS resource sets is the valid SRS resource set, may select a panel from the set of asymmetric panels that is associated with a same number of SRS ports as the valid SRS resource set. For example, if the control signaling 220 indicates that the first SRS resource set associated with the first number of SRS ports is the valid SRS resource set, the UE 115-*a* may select the first panel as a result of the first panel corresponding to the first number of SRS ports.

Alternatively, if the UE 115-*a* is capable of two active uplink panels (but not simultaneous transmissions), both the first SRS resource set and the second SRS resource set may be valid to be triggered for SRS transmission and SRI indication for a PUSCH transmission. In such examples in which the UE 115-*a* is capable of two active uplink panels and two valid SRS resource sets, the UE 115-*a* and the BS 105-*a* may employ a dynamic panel selection to select one of the first SRS resource set or the second SRS resource set. In some implementations, for example, one or more components of the BS 105-*a* may transmit DCI including an SRS resource set dynamic selection field that indicates one of the first SRS resource set or the second SRS resource set. In some examples, the SRS resource set dynamic selection field may include a bit and the BS 105-*a* may set a value of the bit to indicate one of the first SRS resource set or the second SRS resource set. For example, a bit value equal to zero may indicate an SRS resource set of a relatively lower SRS resource set identifier (ID) and a bit value equal to one may indicate the other SRS resource set (such as the SRS resource set of a relatively higher SRS resource set ID). In some other implementations, one or more components of the BS 105-*a* may transmit signaling activating or otherwise indicating a TCI state, different TCI states being configured for or otherwise corresponding to different SRS resource sets.

As such, the UE 115-*a* may select a panel from the set of asymmetric panels corresponding to the indicated SRS resource set. For example, the control signaling 220, which may include one or both of the SRS resource set dynamic selection field in DCI or the TCI state activation signaling, may indicate either the first SRS resource set or the second SRS resource set and the UE 115-*a* may select the first panel or the second panel depending on if the control signaling 220 indicates the first SRS resource set or the second SRS resource set, respectively.

Alternatively, in some other implementations, the UE 115-*a* may receive an indication of one SRS resource set (for a codebook-based uplink MIMO transmission) via the SRS resource set configuration 215 and the number of SRS ports for the SRS resources within the one SRS resource set may be dynamically updated. For example, the BS 105-*a* may update the number of SRS ports that are associated with the SRS resources within the one SRS resource set via MAC-CE signaling or via a DCI field (such as a dedicated DCI field). In some examples, one or more components of the BS 105-*a* may indicate different numbers of SRS ports for the SRS resources within the one SRS resource set depending on whether the UE 115-*a* is capable of operating a single active uplink panel or is capable of operating two active uplink panels.

For example, if the UE 115-*a* is capable of a single active uplink panel, one or more components of the BS 105-*a* may transmit an indication of one number of SRS ports that the UE 115-*a* may assign to the SRS resources within the one SRS resource set. In such examples, the control signaling 220 may include such an indication of the one number of SRS ports and the UE 115-*a* may select a panel for an uplink transmission in accordance with the indicated number of SRS ports. For example, the indicated number of SRS ports may include the first number of SRS ports corresponding to the first panel or the second number of SRS ports corresponding to the second panel and the UE 115-*a* may select the first panel or the second panel accordingly.

Alternatively, if the UE 115-*a* is capable of two active uplink panels (but not simultaneous transmission), one or more components of the BS 105-*a* may transmit an indication of two numbers of SRS ports that the UE 115-*a* may assign to the SRS resources within the one SRS resource set. For example, one or more components of the BS 105-*a* may indicate the first number of SRS ports and the second number of SRS ports and the UE 115-*a* may assign a first set of one or more SRS resources within the one SRS resource set with the first number of SRS ports and may assign a second set of one or more SRS resources within the one SRS resource set with the second number of SRS ports as a result of receiving two numbers of SRS ports. In such examples in which the UE 115-*a* is capable of two active uplink panels and two numbers of SRS ports within the one SRS resource set, the UE 115-*a* and the BS 105-*a* may employ a dynamic panel selection procedure according to which one or more components of the BS 105-*a* may indicate an SRS resource associated with the first number of SRS ports or an SRS resource associated with the second number of SRS ports. In some implementations, for example, one or more components of the BS 105-*a* may transmit DCI including an SRI field that indicates an SRS resource of the one SRS resource set. In such implementations, different SRIs may indicate SRS resources of different number of SRS ports and the UE 115-*a* may select a panel corresponding to the number of SRS ports associated with the indicated SRS resource. In some other implementations, one or more components of the BS 105-*a* may transmit signaling activating or otherwise indicating a TCI state, different TCI states being configured for or otherwise corresponding to different SRS resources within the one SRS resource set.

As such, the UE 115-*a* may select a panel from the set of asymmetric panels corresponding to the indicated SRS resource. For example, the control signaling 220, which may include one or both of the SRI field in DCI or the TCI state activation signaling, may indicate either an SRS resource associated with the first number of SRS ports or an SRS resource associated with the second number of SRS ports and the UE 115-*a* may select the first panel or the second panel depending on if the control signaling 220 indicates an SRS resource associated with the first number of SRS ports or an SRS resource associated with the second number of SRS ports, respectively.

Accordingly, in some implementations, the UE 115-*a* may select a panel entity indicated for a scheduled uplink transmission 225 in accordance with an SRS resource set ID or an SRI. For instance, in examples in which the UE 115-*a* receives an indication of two SRS resource sets via the SRS resource set configuration 215, one or more components of the BS 105-*a* may indicate, via an SRS resource set ID, a resource set of a lower ID to indicate that the UE 115-*a* is to use a first panel or a resource set of a higher ID to indicate that the UE 115-*a* is to use a second panel. Alternatively, in examples in which the UE 115-*a* receives an indication of one SRS resource set via the SRS resource set configuration 215, one or more components of the BS 105-*a* may indicate, via an SRI, an SRS resource associated with relatively fewer or lesser number of SRS ports to indicate that the UE 115-*a* is to use a first panel or an SRS resource associated with a relatively greater or larger number of SRS ports to indicate that the UE 115-*a* is to use a second panel. In some examples, the indication of which panel to use for the uplink transmission 225 may apply for a PUSCH transmission if a scheduling DCI includes such an SRS resource set ID or SRI.

Additionally, or alternatively, the UE 115-*a* may select a panel entity for the uplink transmission 225 in accordance with a reference signal that is used to provide a spatial relation indication in a unified uplink or joint TCI state that one or more components of the BS 105-*a* indicate to the UE 115-*a* (as may be applicable to examples in which the control signaling 220 that the BS 105-*a* uses to indicate an SRS resource or an SRS resource set includes TCI state activation signaling). In some examples, such an indication of which panel to use for the uplink transmission 225 via a unified uplink or joint TCI state may apply for a PUSCH transmission, a physical uplink control channel (PUCCH) transmission, or an SRS transmission. In some examples, the panel entity that corresponds to the indicated reference signal may be configured for a given reference signal receive power (RSRP) reporting instance, such as a Layer 1 (L1)-RSRP reporting instance. In other words, for example, different panel entities may correspond to different indicated reference signals on a reporting instance-by-reporting instance basis, such that across reporting instances a panel entity may correspond to different reference signals (or, in some examples, a same reference signal).

Additionally, or alternatively, one or more components of the BS 105-*a* may signal an explicit panel ID and the UE 115-*a* may select a panel entity for the uplink transmission 225 in accordance with the explicitly indicated panel ID. Further, the UE 115-*a* may, in some implementations, transmit a capability report (which may be equivalently referred to as a UE capability report) indicating an upper limit or maximum number of ports or layers (such as spatial layers) associated with each panel entity of the UE 115-*a* (such as of the set of asymmetric panels supported by the UE 115-*a*) or an upper limit or maximum number of active panels that the UE 115-*a* is capable of operating, or both. A quantity of layers associated with a panel may correspond to a quantity number of ports (such that if a panel is associated with a first quantity of layers that panel is also associated with the first quantity of ports) or each panel may otherwise have a configured association between layers and ports.

As such, the UE 115-*a* may efficiently select a panel to use for performing the uplink transmission 225 to one or more components of the BS 105-*a* in accordance with a number of SRS ports associated with each panel of the set of asymmetric panels supported by the UE 115-*a* and in accordance with the one or more SRS resource sets configured at the UE 115-*a* via the SRS resource set configuration 215. As described herein, the uplink transmission 225 may include an SRS transmission, a transmission over a PUSCH, a transmission over a PUCCH, or any combination thereof. Further, although described herein as including a first panel and a second panel, the set of asymmetric panels that the UE 115-*a* supports may include any number of panels without exceeding the scope of the present disclosure. Further, although described in the context of uplink panel selection, the UE 115-*a* may perform similar operations for selecting a panel for sidelink communication and the BS 105-*a* may perform similar operations for selecting a panel for downlink communication.

Figure 3:
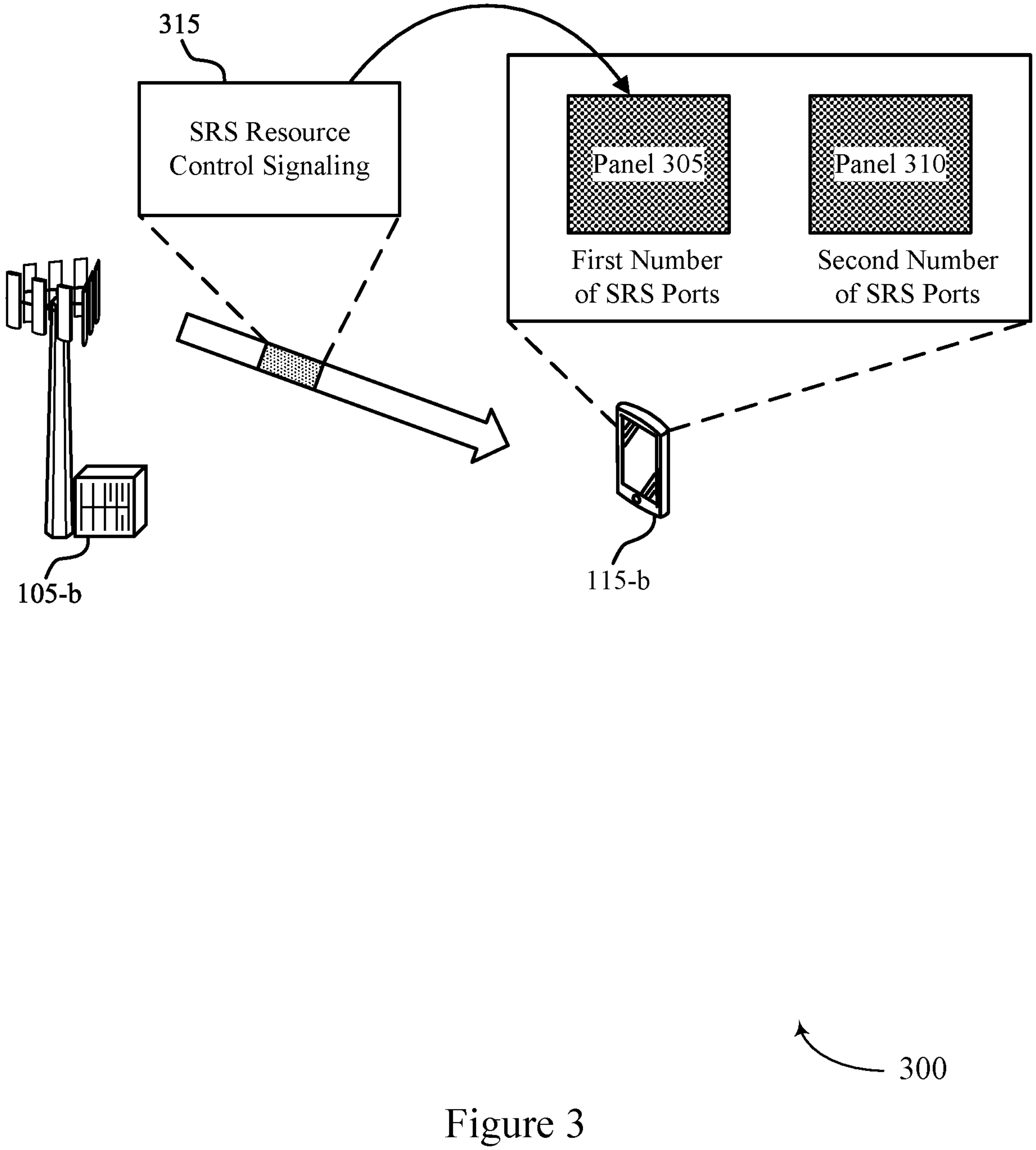

FIG. 3 illustrates an example signaling diagram 300 that supports SRS resource set configuration for asymmetric panels. The signaling diagram 300 may implement or be implemented to realize aspects of the wireless communications system 100 or the signaling diagram 300. For example, the signaling diagram 300 may include a UE 115-*b* and one or more components of a BS 105-*b*, which may be examples of corresponding devices described herein, including with reference to FIGS. 1 and 2. In some examples, the UE 115-*b* may support a set (of multiple) asymmetric panels and, as part of an uplink panel selection procedure, may receive SRS resource control signaling 315 indicating a panel of the set of asymmetric panels in accordance with a respective number of SRS ports associated with each panel of the set of asymmetric panels and one or more configured SRS resource sets.

The UE 115-*b* may feature a number of asymmetric panels (such as a number of asymmetric uplink panels) including a panel 305 and a panel 310. In some examples, the panel 305 may support a first upper limit or maximum number of supportable DMRS ports or MIMO layers for a PUSCH transmission and the panel 310 may support a second upper limit or maximum number of supportable DMRS ports or MIMO layers for a PUSCH transmission. In other words, the panel 305 may support a first number of SRS ports and the panel 310 may support a second number of SRS ports. As such, the panel 305 may be equivalently referred to herein as a first panel and the panel 310 may be equivalently referred to herein as a second panel.

Further, and as described in more detail with reference to FIG. 2, the UE 115-*b* may receive an SRS resource set configuration for one or more SRS resource sets. In some examples, the one or more SRS resource sets may include a first set of SRS resources where each SRS resource in the first set is associated with the first number of SRS ports and a second set of SRS resources where each SRS resource in the second set is associated with the second number of SRS ports. Additionally, or alternatively, the one or more SRS resource sets may include SRS resources that may be dynamically updated with different numbers of SRS ports (such that the SRS resources may be associated with either the first number of SRS ports or the second number of SRS ports).

In some implementations, the BS 105-*b* may transmit control signaling, such as the SRS resource control signaling 315, to the UE 115-*b* to indicate one of the panel 305 or the panel 310 as a panel to use for an uplink transmission from the UE 115-*b*. The SRS resource control signaling 315 may vary across different implementation decisions, but may commonly provide information to the UE 115-*b* that the UE 115-*b* may use to select the panel 305 or the panel 310 for the uplink transmission. In some examples, the SRS resource control signaling 315 may indicate a panel in accordance with a respective number of SRS ports associated with each panel of the set of asymmetric panels and the one or more SRS resource sets that are configured at the UE 115-*b*.

For example, in implementations in which the SRS resource set configuration includes two SRS resource sets and in which the UE 115-*b* is capable of one active uplink panel, for example, the SRS resource control signaling 315 may include signaling indicating a first SRS resource set as a valid SRS resource set, which may indirectly indicate the panel 305 if the panel 305 is associated with a same number of SRS ports as the first SRS resource set (for example, if both the panel 305 and the first SRS resource set are associated with the first number of SRS ports). In implementations in which the SRS resource set configuration includes two SRS resource sets and the UE 115-*b* is capable of two active uplink panels, the SRS resource control signaling 315 may include signaling dynamically indicating a first SRS resource set as a selected SRS resource set, which may similarly indirectly indicate the panel 305 if the panel 305 is associated with a same number of SRS ports as the first SRS resource set.

In implementations in which the SRS resource set configuration includes a single SRS resource set and the UE 115-*b* is capable of one active uplink panel, the SRS resource control signaling 315 may include signaling indicating a number of SRS ports for multiple SRS resources in the single SRS resource set, which may indirectly indicate the panel 305 if the panel 305 is associated with the indicated number of SRS ports (for example, if the indicated number of SRS ports is equal to the first number of SRS ports). In implementations in which the SRS resource set configuration includes a single SRS resource set and the UE 115-*b* is capable of two active uplink panels, the SRS resource control signaling 315 may include an SRI indicating a first SRS resource or an indication of a TCI state associated with the first SRS resource, which may indirectly indicate the panel 305 if the panel 305 is associated with a same number of SRS ports as the first SRS resource (for example, if both the panel 305 and the first SRS resource are associated with the first number of SRS ports).

The UE 115-*b* may select the panel 305 in accordance with the SRS resource control signaling 315, the respective number of SRS ports associated with each panel of the UE 115-*b*, and the one or more configured SRS resource sets and may perform the uplink transmission to one or more components of the BS 105-*b* using the panel 305. As such, the UE 115-*b* and the BS 105-*b* may support efficient uplink panel selection in examples in which the UE 115-*b* features a set of asymmetric panels.

Figure 4:
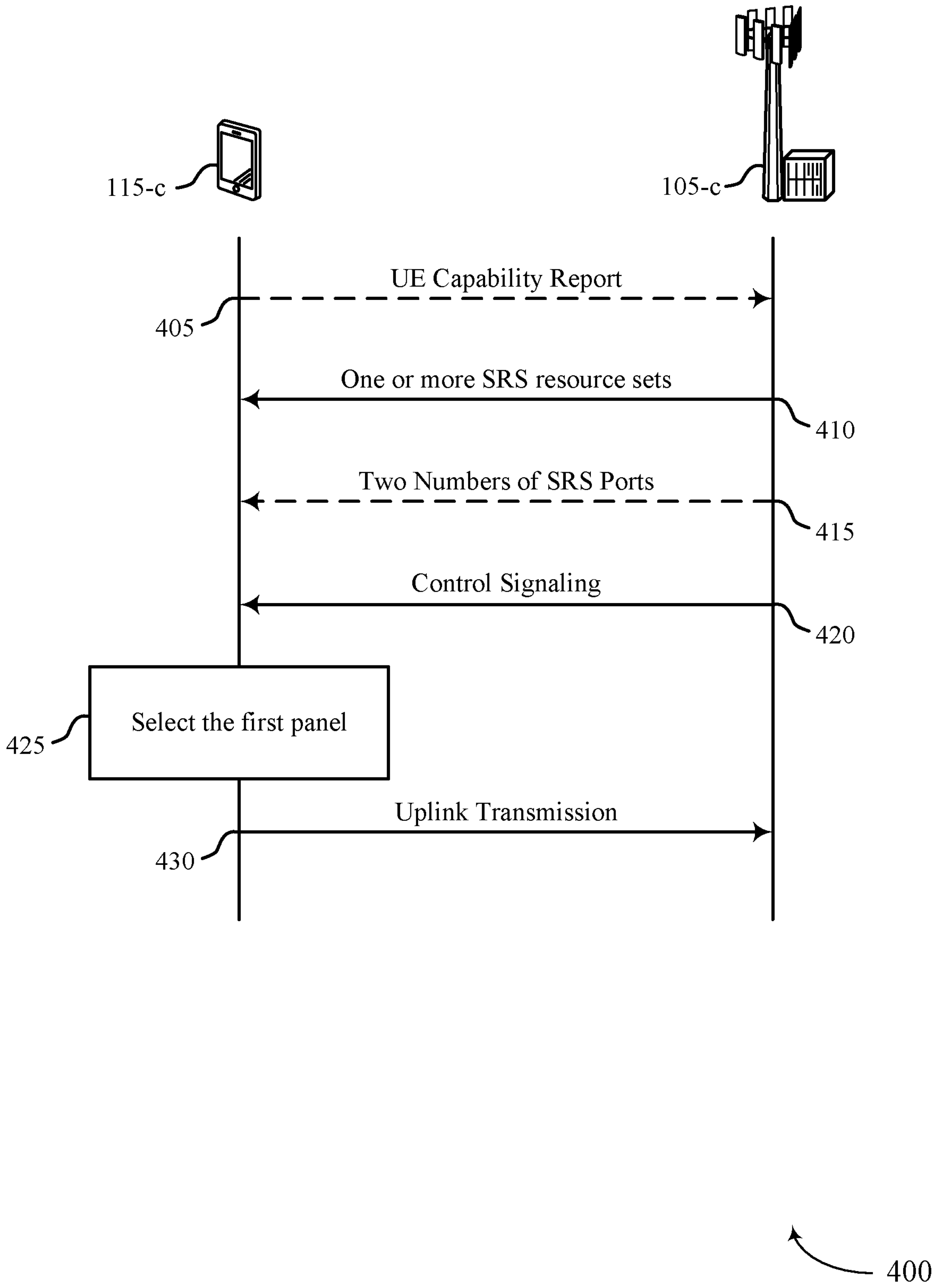
FIG. 4 illustrates an example process flow that supports SRS resource set configuration for asymmetric panels.

FIG. 4 illustrates an example process flow 400 that supports SRS resource set configuration for asymmetric panels. The process flow 400 may implement or be implemented to realize aspects of the wireless communications system 100, the signaling diagram 200, or the signaling diagram 300. For example, the process flow 400 illustrates communication between a UE 115-*c* and one or more components of a BS 105-*c*, which may be examples of corresponding devices described herein, including with reference to FIGS. 1-3. In some examples, the UE 115-*c* may receive a configuration of one or more SRS resource sets including SRS resources that are associated with different numbers of SRS ports and the UE 115-*c* may select a panel to use for an uplink transmission from a set of asymmetric panels in accordance with control signaling from the one or more components of the BS 105-*c* that indirectly indicates the panel via an SRS resource set ID or an SRI, among other examples, or directly indicates the panel via a panel ID.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the UE 115-*c* may transmit a UE capability report indicating a respective upper limit of SRS ports for each panel of the set of asymmetric panels of the UE 115-*c* and an upper limit of active panels that the UE 115-*c* is capable of supporting. For example, the UE 115-*c* may support the set of asymmetric panels such that each panel of the set of asymmetric panels is associated with a different number of SRS ports. In some examples, the set of asymmetric panels may include a first panel that is associated with a first number of SRS ports and a second panel that is associated with a second number of SRS ports.

At 410, the UE 115-*c* may receive, from one or more components of the BS 105-*c*, an indication of one or more SRS resource sets that are associated with an SRS for an uplink transmission. In some examples, the UE 115-*c* may receive the indication of the one or more SRS resource sets via an SRS resource set configuration. In some implementations, the SRS resource set configuration may include two SRS resources sets and SRS resources belonging to different SRS resource sets may be associated with different numbers of SRS ports. For example, SRS resources of a first SRS resource set may be associated with a first number of SRS ports and SRS resources of a second SRS resource set may be associated with a second number of SRS ports. In some other implementations, the SRS resource set configuration may include one SRS resource set and SRS resources of the one SRS resource set may either be associated with different numbers of SRS ports or may be dynamically configurable to be associated with different numbers of SRS ports over time. Additional details relating to such a configuration of the one or more SRS resource sets at the UE 115-*c* are described herein, including with reference to FIG. 2.

At 415, the UE 115-*c* may, in some implementations, receive an indication of two numbers of SRS ports. In some examples, the UE 115-*c* may receive such an indication of two numbers of SRS ports in implementations in which the UE 115-*c* receives the SRS resource set configuration including a single SRS resource set and in which the UE 115-*c* is capable of two active uplink panels, as described in more detail herein, including with reference to FIG. 2. In some examples, the UE 115-*c* may apply or assign the two numbers of SRS ports to multiple SRS resources in the single SRS resource set such that the multiple SRS resources include at least a first SRS resource associated with a first number of SRS ports and a second SRS resource associated with a second number of SRS ports.

At 420, the UE 115-*c* may receive, from one or more components of the BS 105-*c*, control signaling indicating a first panel of the set of asymmetric panels of the UE 115-*c*. In some examples, the control signaling may indicate the first panel in accordance with a respective number of SRS ports associated with each panel of the set of asymmetric panels and the one or more SRS resource sets.

In implementations in which the SRS resource set configuration includes two SRS resource sets and in which the UE 115-*c* is capable of one active uplink panel, for example, the control signaling may include signaling indicating the first SRS resource set as a valid SRS resource set, which may indirectly indicate the first panel if the first panel is associated with a same number of SRS ports as the first SRS resource set (for example, if both the first panel and the first SRS resource set are associated with the first number of SRS ports). Such control signaling indicating the first SRS resource set as the valid SRS resource set may include signaling activating a TCI state associated with the first SRS resource set, MAC-CE signaling (such as a MAC-CE) explicitly activating the first SRS resource set, or MAC-CE signaling (such as a MAC-CE) explicitly activating an SRI field or an SRS resource set selection field in DCI corresponding to the first SRS resource set.

In implementations in which the SRS resource set configuration includes two SRS resource sets and the UE 115-*c* is capable of two active uplink panels, the control signaling may include signaling dynamically indicating the first SRS resource set as a selected SRS resource set, which may similarly indirectly indicate the first panel if the first panel is associated with a same number of SRS ports as the first SRS resource set. Such dynamic signaling may include an SRS resource set ID corresponding to the first SRS resource set in DCI or an indication of a TCI state associated with the first SRS resource set.

In implementations in which the SRS resource set configuration includes a single SRS resource set and the UE 115-*c* is capable of one active uplink panel, the control signaling may include signaling indicating a number of SRS ports for the multiple SRS resources in the single SRS resource set, which may indirectly indicate the first panel if the first panel is associated with the indicated number of SRS ports (for example, if the indicated number of SRS ports is equal to the first number of SRS ports).

In implementations in which the SRS resource set configuration includes a single SRS resource set and the UE 115-*c* is capable of two active uplink panels, the control signaling may include an SRI indicating the first SRS resource or an indication of a TCI state associated with the first SRS resource, which may indirectly indicate the first panel if the first panel is associated with a same number of SRS ports as the first SRS resource (for example, if both the first panel and the first SRS resource are associated with the first number of SRS ports). The control signaling may include such an SRI indicating the first SRS resource or an indication of a TCI state associated with the first SRS resource in examples in which the UE 115-*c* is capable of two active uplink panels and receives the indication of the two numbers of SRS ports at 415.

Additionally, or alternatively, the control signaling may include a spatial relation information for a reference signal associated with the first panel via a unified joint or uplink TCI state indication or an ID associated with the first panel (such as an explicit panel ID) via scheduling information (such as a scheduling DCI), or both. In some examples, and as illustrated by and described in more detail with reference to FIG. 3, the control signaling may be associated with one or more SRS resources and may be equivalently referred to herein as SRS resource control signaling.

At 425, the UE 115-*c* may select, from the set of asymmetric panels of the UE 115-*c*, the first panel in accordance with the control signaling.

At 430, the UE 115-*c* may perform the uplink transmission via the first panel. In some examples, performing the uplink transmission may include transmitting an SRS, a PUSCH transmission, a PUCCH transmission, or any combination thereof.

Figure 5:
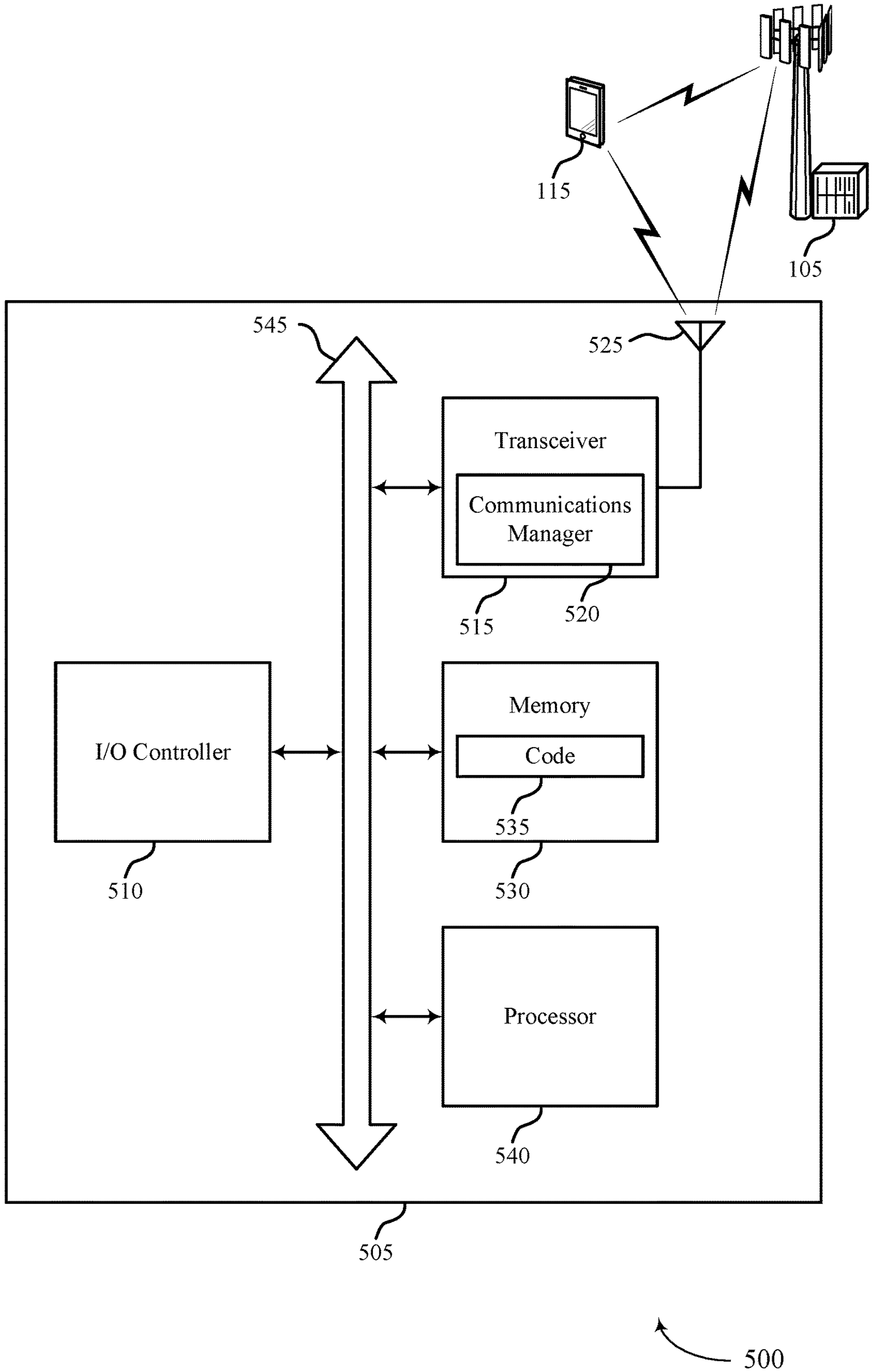
FIGS. 5 and 6 show block diagrams of example devices that support SRS resource set configuration for asymmetric panels.

FIG. 5 shows a block diagram 500 of an example device 505 that supports SRS resource set configuration for asymmetric panels. The device 505 may communicate wirelessly with one or more BSs 105, UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The I/O controller 510 may manage input and output signals for the device 505. The I/O controller 510 also may manage peripherals not integrated into the device 505. In some implementations, the I/O controller 510 may represent a physical connection or port to an external peripheral. In some implementations, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some implementations, the I/O controller 510 may be implemented as part of a processor or processing system, such as the processor 540. In some implementations, a user may interact with the device 505 via the I/O controller 510 or via hardware components controlled by the I/O controller 510.

In some implementations, the device 505 may include a single antenna 525. However, in some other implementations, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

In some implementations, the transceiver 515 may include one or more interfaces, such as one or more interfaces coupled with the one or more antennas 525 that are configured to support various receiving or obtaining operations, or one or more interfaces coupled with the one or more antennas 525 that are configured to support various transmitting or outputting operations, or a combination thereof. In some implementations, the transceiver 515 may include or be configured for coupling with one or more processors or memory components that are operable to perform or support operations based on received or obtained information or signals, or to generate information or other signals for transmission or other outputting, or any combination thereof. In some implementations, the transceiver 515, or the transceiver 515 and the one or more antennas 525, or the transceiver 515 and the one or more antennas 525 and one or more processors or memory components (for example, the processor 540, or the memory 530, or both), may be included in a chip or chip assembly that is installed in the device 505.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (for example, when compiled and executed) to perform functions described herein. In some implementations, the memory 530 may contain, among other things, a basic I/O system (BIOS) which may control basic hardware or software operation such as the interaction with peripheral components or devices.

The processor 540 may be any one or more suitable processors capable of executing scripts or instructions of one or more software programs stored in the device 505 (such as within the memory 530). In some implementations, the processor 540 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 540, or the transceiver 515, or the communications manager 520, or other components or combinations of components of the device 505.

The processing system of the device 505 may interface with other components of the device 505, and may process information received from other components (such as inputs or signals) or output information to other components. For example, a chip or modem of the device 505 may include a processing system, a first interface to output information, and a second interface to obtain information. In some implementations, the first interface may refer to an interface between the processing system of the chip or modem and a transmitter, such that the device 505 may transmit information output from the chip or modem. In some implementations, the second interface may refer to an interface between the processing system of the chip or modem and a receiver, such that the device 505 may obtain information or signal inputs, and the information may be passed to the processing system. A person having ordinary skill in the art will readily recognize that the first interface also may obtain information or signal inputs, and the second interface also may output information or signal outputs.

The communications manager 520 may support wireless communication at a UE in accordance with examples as disclosed herein. For example, the communications manager 520 may be configured as or otherwise support a means for receiving an indication of one or more SRS resource sets associated with an SRS for an uplink transmission. The communications manager 520 may be configured as or otherwise support a means for receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The communications manager 520 may be configured as or otherwise support a means for selecting, from the set of asymmetric panels of the UE, the first panel in accordance with the control signaling. The communications manager 520 may be configured as or otherwise support a means for performing the uplink transmission via the first panel.

In some examples, to support receiving the indication of the one or more SRS resource sets associated with the SRS for the uplink transmission, the communications manager 520 may be configured as or otherwise support a means for receiving an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

In some examples, to support receiving the control signaling indicating the first panel of the set of asymmetric panels, the communications manager 520 may be configured as or otherwise support a means for receiving signaling indicating the first SRS resource set as a valid SRS resource set, where selecting the first panel is a result of the first SRS resource set being the valid SRS resource set.

In some examples, to support signaling indicating the first SRS resource set as the valid SRS resource set, the communications manager 520 may be configured as or otherwise support a means for signaling activating a TCI state associated with the first SRS resource set. In some examples, to support signaling indicating the first SRS resource set as the valid SRS resource set, the communications manager 520 may be configured as or otherwise support a means for MAC-CE signaling explicitly activating the first SRS resource set. In some examples, to support signaling indicating the first SRS resource set as the valid SRS resource set, the communications manager 520 may be configured as or otherwise support a means for MAC-CE signaling explicitly activating an SRI field or an SRS resource set selection field in DCI corresponding to the first SRS resource set.

In some examples, to support receiving the control signaling indicating the first panel of the set of asymmetric panels, the communications manager 520 may be configured as or otherwise support a means for receiving signaling dynamically indicating the first SRS resource set as a selected SRS resource set, where selecting the first panel is a result of the first SRS resource set being indicated as the selected SRS resource set.

In some examples, to support receiving the signaling dynamically indicating the first SRS resource set as the selected SRS resource set, the communications manager 520 may be configured as or otherwise support a means for receiving an SRS resource set identifier corresponding to the first SRS resource set via DCI.

In some examples, to support receiving the signaling dynamically indicating the first SRS resource set as the selected SRS resource set, the communications manager 520 may be configured as or otherwise support a means for receiving an indication of a TCI state associated with the first SRS resource set.

In some examples, to support receiving the indication of the one or more SRS resource sets associated with the SRS for the uplink transmission, the communications manager 520 may be configured as or otherwise support a means for receiving an indication of a single SRS resource set associated with the SRS for the uplink transmission, the single SRS resource set including multiple SRS resources, where the multiple SRS resources in the single SRS resource set are configurable with a dynamic number of SRS ports.

In some examples, to support receiving the control signaling indicating the first panel of the set of asymmetric panels, the communications manager 520 may be configured as or otherwise support a means for receiving signaling indicating a number of SRS ports for the multiple SRS resources in the single SRS resource set, where selecting the first panel is a result of the number of SRS ports being indicated for the multiple SRS resources in the single SRS resource set.

In some examples, the UE is capable of two active uplink panels, and the communications manager 520 may be configured as or otherwise support a means for receiving an indication of two numbers of SRS ports for the multiple SRS resources in the single SRS resource set, the multiple SRS resources including at least a first SRS resource associated with a first number of SRS ports and a second SRS resource associated with a second number of SRS ports.

In some examples, to support receiving the control signaling indicating the first panel of the set of asymmetric panels, the communications manager 520 may be configured as or otherwise support a means for receiving an SRI indicating the first SRS resource associated with the first number of SRS ports, where selecting the first panel is a result of the SRI indicating the first SRS resource associated with the first number of SRS ports.

In some examples, to support receiving the control signaling indicating the first panel of the set of asymmetric panels, the communications manager 520 may be configured as or otherwise support a means for receiving an indication of a TCI state associated with the first SRS resource, where selecting the first panel is a result of receiving the indication of the TCI state associated with the first SRS resource.

In some examples, to support receiving the control signaling indicating the first panel of the set of asymmetric panels, the communications manager 520 may be configured as or otherwise support a means for receiving spatial relation information for a reference signal associated with the first panel, where selecting the first panel is a result of receiving the spatial relation information for the reference signal associated with the first panel.

In some examples, to support receiving the control signaling indicating the first panel of the set of asymmetric panels, the communications manager 520 may be configured as or otherwise support a means for receiving an identifier associated with the first panel via scheduling information, where selecting the first panel is a result of receiving the identifier associated with the first panel via the scheduling information.

In some examples, the communications manager 520 may be configured as or otherwise support a means for transmitting a UE capability report indicating a respective upper limit of SRS ports for each panel of the set of asymmetric panels of the UE and an upper limit of active panels that the UE is capable of supporting, where receiving the control signaling indicating the first panel of the set of asymmetric panels is in accordance with the UE capability report.

In some implementations, the communications manager 520 may be configured to perform various operations (for example, receiving, monitoring, transmitting) using or otherwise in cooperation with the transceiver 515, the one or more antennas 525, or any combination thereof. Although the communications manager 520 is illustrated as a separate component, in some implementations, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of SRS resource set configuration for asymmetric panels as described herein, or the processor 540 and the memory 530 may be otherwise configured to perform or support such operations.

Figure 6:
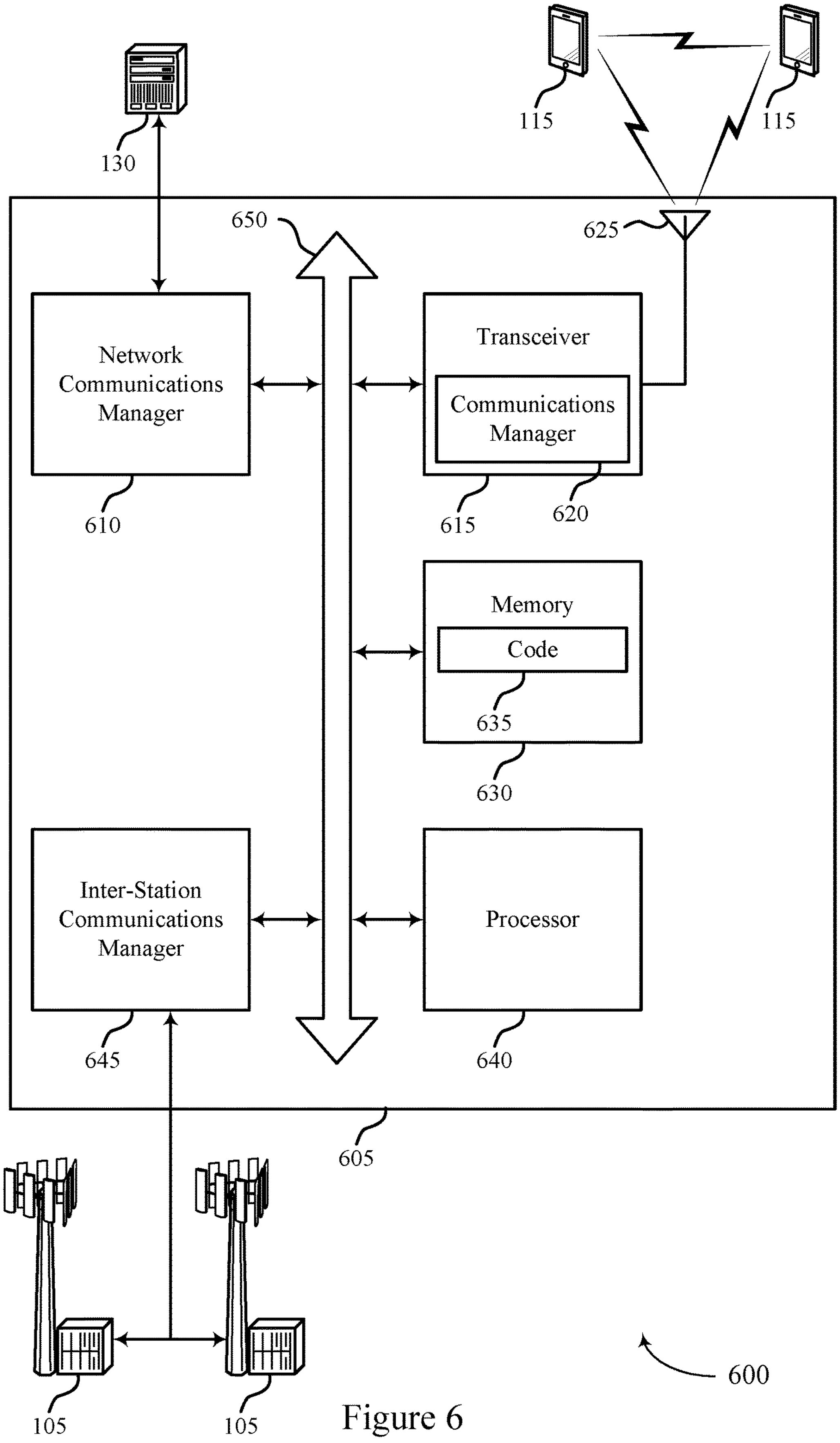

FIG. 6 shows a block diagram 600 of an example device 605 that supports SRS resource set configuration for asymmetric panels. The device 605 may communicate wirelessly with one or more BSs 105, UEs 115, or any combination thereof. The device 605 may include components for bi-directional voice and data communications including components for transmitting and receiving communications, such as a communications manager 620, a network communications manager 610, a transceiver 615, an antenna 625, a memory 630, code 635, a processor 640, and an inter-station communications manager 645. These components may be in electronic communication or otherwise coupled (such as operatively, communicatively, functionally, electronically, electrically) via one or more buses (such as a bus 650).

The network communications manager 610 may manage communications with a core network 130 (for example, via one or more wired backhaul links). For example, the network communications manager 610 may manage the transfer of data communications for client devices, such as one or more UEs 115.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (for example, the processor 640, or the memory 630, or both), may be included in a chip or chip assembly that is installed in the device 605.

The memory 630 may include RAM and ROM. The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (for example, when compiled and executed) to perform functions described herein. In some implementations, the memory 630 may contain, among other things, a BIOS which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system, a first interface to output information, and a second interface to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The inter-station communications manager 645 may manage communications with other BSs 105, and may include a controller or scheduler for controlling communications with UEs 115 in cooperation with other BSs 105. For example, the inter-station communications manager 645 may coordinate scheduling for transmissions to UEs 115 for various interference mitigation techniques such as beamforming or joint transmission. In some implementations, the inter-station communications manager 645 may provide an X2 interface within an LTE/LTE-A wireless communications network technology to provide communication between BSs 105.

The communications manager 620 may support wireless communication at a network entity in accordance with examples as disclosed herein. For example, the communications manager 620 may be configured as or otherwise support a means for transmitting, to a UE, an indication of one or more SRS resource sets associated with an SRS for an uplink transmission. The communications manager 620 may be configured as or otherwise support a means for transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The communications manager 620 may be configured as or otherwise support a means for receiving, from the UE, the uplink transmission via the first panel of the UE.

In some examples, to support transmitting the indication of the one or more SRS resource sets associated with the SRS for the uplink transmission, the communications manager 620 may be configured as or otherwise support a means for transmitting an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

In some examples, to support transmitting the control signaling indicating the first panel of the set of asymmetric panels, the communications manager 620 may be configured as or otherwise support a means for transmitting signaling indicating the first SRS resource set as a valid SRS resource set, where receiving the uplink transmission via the first panel of the UE is a result of the first SRS resource set being the valid SRS resource set.

In some examples, to support signaling indicating the first SRS resource set as the valid SRS resource set, the communications manager 620 may be configured as or otherwise support a means for signaling activating a TCI state associated with the first SRS resource set. In some examples, to support signaling indicating the first SRS resource set as the valid SRS resource set, the communications manager 620 may be configured as or otherwise support a means for MAC-CE signaling explicitly activating the first SRS resource set. In some examples, to support signaling indicating the first SRS resource set as the valid SRS resource set, the communications manager 620 may be configured as or otherwise support a means for MAC-CE signaling explicitly activating an SRI field or an SRS resource set selection field in DCI corresponding to the first SRS resource set.

In some examples, to support transmitting the control signaling indicating the first panel of the set of asymmetric panels, the communications manager 620 may be configured as or otherwise support a means for transmitting signaling dynamically indicating the first SRS resource set as a selected SRS resource set, where receiving the uplink transmission via the first panel of the UE is a result of the first SRS resource set being indicated as the selected SRS resource set.

In some examples, to support transmitting the signaling dynamically indicating the first SRS resource set as the selected SRS resource set, the communications manager 620 may be configured as or otherwise support a means for transmitting an SRS resource set identifier corresponding to the first SRS resource set via DCI.

In some examples, to support transmitting the signaling dynamically indicating the first SRS resource set as the selected SRS resource set, the communications manager 620 may be configured as or otherwise support a means for transmitting an indication of a TCI state associated with the first SRS resource set.

In some examples, to support transmitting the indication of the one or more SRS resource sets associated with the SRS for the uplink transmission, the communications manager 620 may be configured as or otherwise support a means for transmitting an indication of a single SRS resource set associated with the SRS for the uplink transmission, the single SRS resource set including multiple SRS resources, where the multiple SRS resources in the single SRS resource set are configurable with a dynamic number of SRS ports.

In some examples, to support transmitting the control signaling indicating the first panel of the set of asymmetric panels, the communications manager 620 may be configured as or otherwise support a means for transmitting signaling indicating a number of SRS ports for the multiple SRS resources in the single SRS resource set, where receiving the uplink transmission via the first panel of the UE is a result of the number of SRS ports being indicated for the multiple SRS resources in the single SRS resource set.

In some examples, the UE is capable of two active uplink panels, and the communications manager 620 may be configured as or otherwise support a means for transmitting an indication of two numbers of SRS ports for the multiple SRS resources in the single SRS resource set, the multiple SRS resources including at least a first SRS resource associated with a first number of SRS ports and a second SRS resource associated with a second number of SRS ports.

In some examples, to support transmitting the control signaling indicating the first panel of the set of asymmetric panels, the communications manager 620 may be configured as or otherwise support a means for transmitting an SRI indicating the first SRS resource associated with the first number of SRS ports, where receiving the uplink transmission via the first panel of the UE is a result of the SRI indicating the first SRS resource associated with the first number of SRS ports.

In some examples, to support transmitting the control signaling indicating the first panel of the set of asymmetric panels, the communications manager 620 may be configured as or otherwise support a means for transmitting an indication of a TCI state associated with the first SRS resource, where receiving the uplink transmission via the first panel of the UE is a result of transmitting the indication of the TCI state associated with the first SRS resource.

In some examples, to support transmitting the control signaling indicating the first panel of the set of asymmetric panels, the communications manager 620 may be configured as or otherwise support a means for transmitting spatial relation information for a reference signal associated with the first panel, where receiving the uplink transmission via the first panel of the UE is a result of transmitting the spatial relation information for the reference signal associated with the first panel.

In some examples, to support transmitting the control signaling indicating the first panel of the set of asymmetric panels, the communications manager 620 may be configured as or otherwise support a means for transmitting an identifier associated with the first panel via scheduling information, where receiving the uplink transmission via the first panel of the UE is a result of transmitting the identifier associated with the first panel via the scheduling information.

In some examples, the communications manager 620 may be configured as or otherwise support a means for receiving a UE capability report indicating a respective upper limit of SRS ports for each panel of the set of asymmetric panels of the UE and an upper limit of active panels that the UE is capable of supporting, where transmitting the control signaling indicating the first panel of the set of asymmetric panels is in accordance with the UE capability report.

In some implementations, the communications manager 620 may be configured to perform various operations (for example, receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of SRS resource set configuration for asymmetric panels as described herein, or the processor 640 and the memory 630 may be otherwise configured to perform or support such operations.

Figure 7:
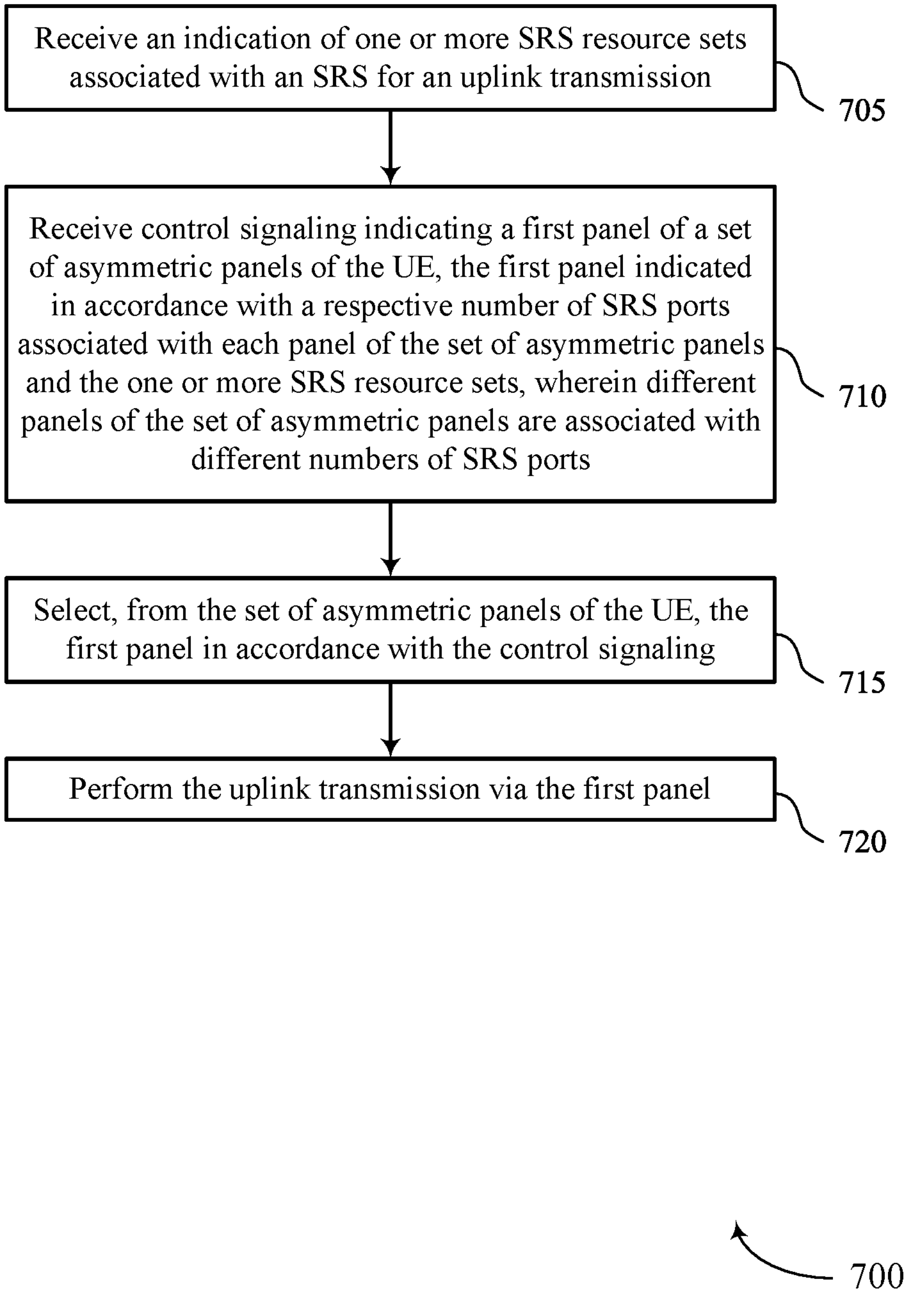
FIGS. 7 and 8 show flowcharts illustrating example methods that support SRS resource set configuration for asymmetric panels.

FIG. 7 shows a flowchart illustrating an example method 700 that supports SRS resource set configuration for asymmetric panels. The operations of the method 700 may be implemented by a UE or its components as described herein. For example, the operations of the method 700 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 705, the method may include receiving an indication of one or more SRS resource sets associated with an SRS for an uplink transmission. The operations of 705 may be performed in accordance with examples as disclosed herein. In some examples, aspects of the operations of 705 may be performed by a communications manager 420 as described with reference to FIG. 4.

At 710, the method may include receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The operations of 710 may be performed in accordance with examples as disclosed herein. In some examples, aspects of the operations of 710 may be performed by a communications manager 420 as described with reference to FIG. 4.

At 715, the method may include selecting, from the set of asymmetric panels of the UE, the first panel in accordance with the control signaling. The operations of 715 may be performed in accordance with examples as disclosed herein. In some examples, aspects of the operations of 715 may be performed by a communications manager 420 as described with reference to FIG. 4.

At 720, the method may include performing the uplink transmission via the first panel. The operations of 720 may be performed in accordance with examples as disclosed herein. In some examples, aspects of the operations of 720 may be performed by a communications manager 420 as described with reference to FIG. 4.

Figure 8:
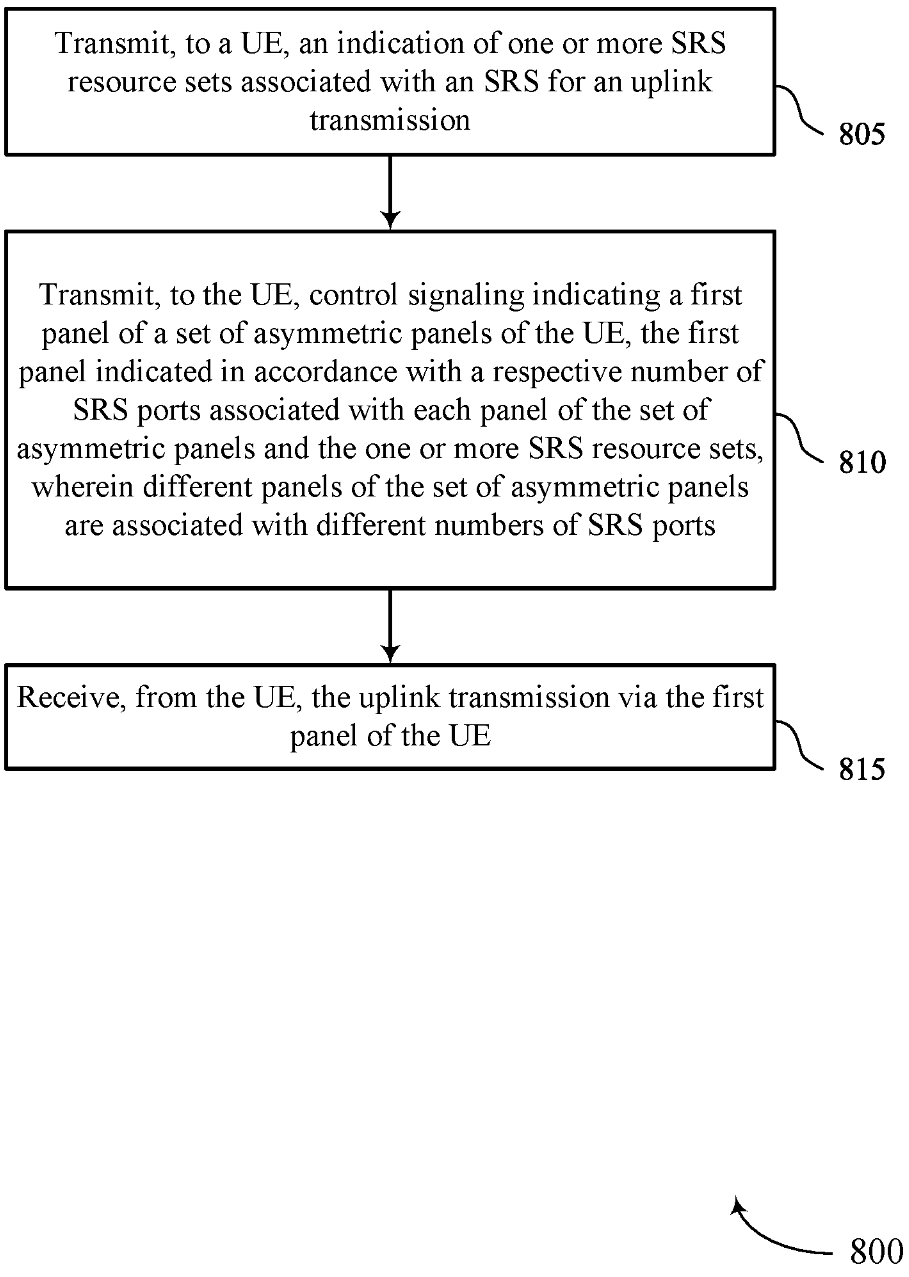

FIG. 8 shows a flowchart illustrating an example method 800 that supports SRS resource set configuration for asymmetric panels. The operations of the method 800 may be implemented by a BS or its components as described herein. For example, the operations of the method 800 may be performed by a BS 105 as described with reference to FIGS. 1-4 and 6. In some examples, a BS may execute a set of instructions to control the functional elements of the BS to perform the described functions. Additionally, or alternatively, the BS may perform aspects of the described functions using special-purpose hardware.

At 805, the method may include transmitting, to a UE, an indication of one or more SRS resource sets associated with an SRS for an uplink transmission. The operations of 805 may be performed in accordance with examples as disclosed herein. In some examples, aspects of the operations of 805 may be performed by a communications manager 520 as described with reference to FIG. 5.

At 810, the method may include transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports. The operations of 810 may be performed in accordance with examples as disclosed herein. In some examples, aspects of the operations of 810 may be performed by a communications manager 520 as described with reference to FIG. 5.

At 815, the method may include receiving, from the UE, the uplink transmission via the first panel of the UE. The operations of 815 may be performed in accordance with examples as disclosed herein. In some examples, aspects of the operations of 815 may be performed by a communications manager 520 as described with reference to FIG. 5.

The following provides an overview of some aspects of the present disclosure:

Aspect 1: A method for wireless communication at a UE, including: receiving an indication of one or more SRS resource sets associated with an SRS for an uplink transmission; receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; selecting, from the set of asymmetric panels of the UE, the first panel in accordance with the control signaling; and performing the uplink transmission via the first panel.

Aspect 2: The method of aspect 1, where receiving the indication of the one or more SRS resource sets associated with the SRS for the uplink transmission further includes: receiving an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 3: The method of aspect 2, where the UE is capable of a single active uplink panel and a single valid SRS resource set, and where receiving the control signaling indicating the first panel of the set of asymmetric panels further includes: receiving signaling indicating the first SRS resource set as a valid SRS resource set, where selecting the first panel is a result of the first SRS resource set being the valid SRS resource set.

Aspect 4: The method of aspect 3, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 5: The method of aspect 2, where the UE is capable of two active uplink panels and two valid SRS resource sets, and where receiving the control signaling indicating the first panel of the set of asymmetric panels further includes: receiving signaling dynamically indicating the first SRS resource set as a selected SRS resource set, where selecting the first panel is a result of the first SRS resource set being indicated as the selected SRS resource set.

Aspect 6: The method of aspect 5, where receiving the signaling dynamically indicating the first SRS resource set as the selected SRS resource set further includes: receiving an SRS resource set identifier corresponding to the first SRS resource set via DCI.

Aspect 7: The method of any of aspects 5 or 6, where receiving the signaling dynamically indicating the first SRS resource set as the selected SRS resource set further includes: receiving an indication of a transmission configuration indicator (TCI) state associated with the first SRS resource set.

Aspect 8: The method of aspect 1, where receiving the indication of the one or more SRS resource sets associated with the SRS for the uplink transmission further includes: receiving an indication of a single SRS resource set associated with the SRS for the uplink transmission, the single SRS resource set including multiple SRS resources, where the multiple SRS resources in the single SRS resource set are configurable with a dynamic number of SRS ports.

Aspect 9: The method of aspect 8, where the UE is capable of a single active uplink panel, and where receiving the control signaling indicating the first panel of the set of asymmetric panels further includes: receiving signaling indicating a number of SRS ports for the multiple SRS resources in the single SRS resource set, where selecting the first panel is a result of the number of SRS ports being indicated for the multiple SRS resources in the single SRS resource set.

Aspect 10: The method of aspect 8, where the UE is capable of two active uplink panels, the method further including: receiving an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 11: The method of aspect 10, where receiving the control signaling indicating the first panel of the set of asymmetric panels further includes: receiving an SRI indicating the first SRS resource associated with the first number of SRS ports, where selecting the first panel is a result of the SRI indicating the first SRS resource associated with the first number of SRS ports.

Aspect 12: The method of any of aspects 10 or 11, where receiving the control signaling indicating the first panel of the set of asymmetric panels further includes: receiving an indication of a TCI state associated with the first SRS resource, where selecting the first panel is a result of receiving the indication of the TCI state associated with the first SRS resource.

Aspect 13: The method of any of aspects 1-12, where receiving the control signaling indicating the first panel of the set of asymmetric panels further includes: receiving spatial relation information for a reference signal associated with the first panel, where selecting the first panel is a result of receiving the spatial relation information for the reference signal associated with the first panel.

Aspect 14: The method of any of aspects 1-13, where receiving the control signaling indicating the first panel of the set of asymmetric panels further includes: receiving an identifier associated with the first panel via scheduling information, where selecting the first panel is a result of receiving the identifier associated with the first panel via the scheduling information.

Aspect 15: The method of any of aspects 1-14, further including: transmitting a UE capability report indicating a respective upper limit of SRS ports for each panel of the set of asymmetric panels of the UE and an upper limit of active panels that the UE is capable of supporting, where receiving the control signaling indicating the first panel of the set of asymmetric panels is in accordance with the UE capability report.

Aspect 16: A method for wireless communication at a network entity, including: transmitting, to a UE, an indication of one or more SRS resource sets associated with an SRS for an uplink transmission; transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; and receiving, from the UE, the uplink transmission via the first panel of the UE.

Aspect 17: The method of aspect 16, where transmitting the indication of the one or more SRS resource sets associated with the SRS for the uplink transmission further includes: transmitting an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 18: The method of aspect 17, where the UE is capable of a single active uplink panel and a single valid SRS resource set, and where transmitting the control signaling indicating the first panel of the set of asymmetric panels further includes: transmitting signaling indicating the first SRS resource set as a valid SRS resource set, where receiving the uplink transmission via the first panel of the UE is a result of the first SRS resource set being the valid SRS resource set.

Aspect 19: The method of aspect 18, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 20: The method of aspect 17, where the UE is capable of two active uplink panels and two valid SRS resource sets, and where transmitting the control signaling indicating the first panel of the set of asymmetric panels further includes: transmitting signaling dynamically indicating the first SRS resource set as a selected SRS resource set, where receiving the uplink transmission via the first panel of the UE is a result of the first SRS resource set being indicated as the selected SRS resource set.

Aspect 21: The method of aspect 20, where transmitting the signaling dynamically indicating the first SRS resource set as the selected SRS resource set further includes: transmitting an SRS resource set identifier corresponding to the first SRS resource set via DCI.

Aspect 22: The method of any of aspects 20 or 21, where transmitting the signaling dynamically indicating the first SRS resource set as the selected SRS resource set further includes: transmitting an indication of a TCI state associated with the first SRS resource set.

Aspect 23: The method of aspect 16, where transmitting the indication of the one or more SRS resource sets associated with the SRS for the uplink transmission further includes: transmitting an indication of a single SRS resource set associated with the SRS for the uplink transmission, the single SRS resource set including multiple SRS resources, where the multiple SRS resources in the single SRS resource set are configurable with a dynamic number of SRS ports.

Aspect 24: The method of aspect 23, where the UE is capable of a single active uplink panel, and where transmitting the control signaling indicating the first panel of the set of asymmetric panels further includes: transmitting signaling indicating a number of SRS ports for the multiple SRS resources in the single SRS resource set, where receiving the uplink transmission via the first panel of the UE is a result of the number of SRS ports being indicated for the multiple SRS resources in the single SRS resource set.

Aspect 25: The method of aspect 23, where the UE is capable of two active uplink panels, the method further including: transmitting an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 26: The method of aspect 25, where transmitting the control signaling indicating the first panel of the set of asymmetric panels further includes: transmitting an SRI indicating the first SRS resource associated with the first number of SRS ports, where receiving the uplink transmission via the first panel of the UE is a result of the SRI indicating the first SRS resource associated with the first number of SRS ports.

Aspect 27: The method of any of aspects 25 or 26, where transmitting the control signaling indicating the first panel of the set of asymmetric panels further includes: transmitting an indication of a TCI state associated with the first SRS resource, where receiving the uplink transmission via the first panel of the UE is a result of transmitting the indication of the TCI state associated with the first SRS resource.

Aspect 28: The method of any of aspects 16-27, where transmitting the control signaling indicating the first panel of the set of asymmetric panels further includes: transmitting spatial relation information for a reference signal associated with the first panel, where receiving the uplink transmission via the first panel of the UE is a result of transmitting the spatial relation information for the reference signal associated with the first panel.

Aspect 29: The method of any of aspects 16-28, where transmitting the control signaling indicating the first panel of the set of asymmetric panels further includes: transmitting an identifier associated with the first panel via scheduling information, where receiving the uplink transmission via the first panel of the UE is a result of transmitting the identifier associated with the first panel via the scheduling information.

Aspect 30: The method of any of aspects 16-29, further including: receiving a UE capability report indicating a respective upper limit of SRS ports for each panel of the set of asymmetric panels of the UE and an upper limit of active panels that the UE is capable of supporting, where transmitting the control signaling indicating the first panel of the set of asymmetric panels is in accordance with the UE capability report.

Aspect 31: An apparatus for wireless communication at a UE, including: a first interface configured to obtain an indication of one or more SRS resource sets associated with an SRS for an uplink transmission; and obtain control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; a processing system configured to select, from the set of asymmetric panels of the UE, the first panel in accordance with the control signaling; and the first interface or a second interface configured to perform the uplink transmission via the first panel.

Aspect 32: The apparatus of aspect 31, where obtaining the indication of the one or more SRS resource sets associated with the SRS for the uplink transmission further includes: obtaining an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 33: The apparatus of aspect 32, where the UE is capable of a single active uplink panel and a single valid SRS resource set, and where obtaining the control signaling indicating the first panel of the set of asymmetric panels further includes: obtaining signaling indicating the first SRS resource set as a valid SRS resource set, where selecting the first panel is a result of the first SRS resource set being the valid SRS resource set.

Aspect 34: The apparatus of aspect 33, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 35: The apparatus of aspect 32, where the UE is capable of two active uplink panels and two valid SRS resource sets, and where obtaining the control signaling indicating the first panel of the set of asymmetric panels further includes: obtaining signaling dynamically indicating the first SRS resource set as a selected SRS resource set, where selecting the first panel is a result of the first SRS resource set being indicated as the selected SRS resource set.

Aspect 36: The apparatus of aspect 35, where obtaining the signaling dynamically indicating the first SRS resource set as the selected SRS resource set further includes: obtaining an SRS resource set identifier corresponding to the first SRS resource set via DCI.

Aspect 37: The apparatus of any of aspects 35 or 36, where obtaining the signaling dynamically indicating the first SRS resource set as the selected SRS resource set further includes: obtaining an indication of a transmission configuration indicator (TCI) state associated with the first SRS resource set.

Aspect 38: The apparatus of aspect 31, where obtaining the indication of the one or more SRS resource sets associated with the SRS for the uplink transmission further includes: obtaining an indication of a single SRS resource set associated with the SRS for the uplink transmission, the single SRS resource set including multiple SRS resources, where the multiple SRS resources in the single SRS resource set are configurable with a dynamic number of SRS ports.

Aspect 39: The apparatus of aspect 38, where the UE is capable of a single active uplink panel, and where obtaining the control signaling indicating the first panel of the set of asymmetric panels further includes: obtaining signaling indicating a number of SRS ports for the multiple SRS resources in the single SRS resource set, where selecting the first panel is a result of the number of SRS ports being indicated for the multiple SRS resources in the single SRS resource set.

Aspect 40: The apparatus of aspect 38, where the UE is capable of two active uplink panels, the first interface or the second interface further configured to: obtain an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 41: The apparatus of aspect 40, where obtaining the control signaling indicating the first panel of the set of asymmetric panels further includes: obtaining an SRI indicating the first SRS resource associated with the first number of SRS ports, where selecting the first panel is a result of the SRI indicating the first SRS resource associated with the first number of SRS ports.

Aspect 42: The apparatus of any of aspects 40 or 41, where obtaining the control signaling indicating the first panel of the set of asymmetric panels further includes: obtaining an indication of a TCI state associated with the first SRS resource, where selecting the first panel is a result of obtaining the indication of the TCI state associated with the first SRS resource.

Aspect 43: The apparatus of any of aspects 31-42, where obtaining the control signaling indicating the first panel of the set of asymmetric panels further includes: obtaining spatial relation information for a reference signal associated with the first panel, where selecting the first panel is a result of obtaining the spatial relation information for the reference signal associated with the first panel.

Aspect 44: The apparatus of any of aspects 31-43, where obtaining the control signaling indicating the first panel of the set of asymmetric panels further includes: obtaining an identifier associated with the first panel via scheduling information, where selecting the first panel is a result of obtaining the identifier associated with the first panel via the scheduling information.

Aspect 45: The apparatus of any of aspects 31-44, where the first interface or the second interface are further configured to: output a UE capability report indicating a respective upper limit of SRS ports for each panel of the set of asymmetric panels of the UE and an upper limit of active panels that the UE is capable of supporting, where obtaining the control signaling indicating the first panel of the set of asymmetric panels is in accordance with the UE capability report.

Aspect 46: An apparatus for wireless communication at a network entity, including: a first interface configured to output, to a UE, an indication of one or more SRS resource sets associated with an SRS for an uplink transmission; and output, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; and the first interface or a second interface is configured to obtain, from the UE, the uplink transmission via the first panel of the UE.

Aspect 47: The apparatus of aspect 46, where outputting the indication of the one or more SRS resource sets associated with the SRS for the uplink transmission further includes: outputting an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 48: The apparatus of aspect 47, where the UE is capable of a single active uplink panel and a single valid SRS resource set, and where outputting the control signaling indicating the first panel of the set of asymmetric panels further includes: outputting signaling indicating the first SRS resource set as a valid SRS resource set, where obtaining the uplink transmission via the first panel of the UE is a result of the first SRS resource set being the valid SRS resource set.

Aspect 49: The apparatus of aspect 48, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 50: The apparatus of aspect 47, where the UE is capable of two active uplink panels and two valid SRS resource sets, and where outputting the control signaling indicating the first panel of the set of asymmetric panels further includes: outputting signaling dynamically indicating the first SRS resource set as a selected SRS resource set, where obtaining the uplink transmission via the first panel of the UE is a result of the first SRS resource set being indicated as the selected SRS resource set.

Aspect 51: The apparatus of aspect 50, where outputting the signaling dynamically indicating the first SRS resource set as the selected SRS resource set further includes: outputting an SRS resource set identifier corresponding to the first SRS resource set via DCI.

Aspect 52: The apparatus of any of aspects 50 or 51, where outputting the signaling dynamically indicating the first SRS resource set as the selected SRS resource set further includes: outputting an indication of a TCI state associated with the first SRS resource set.

Aspect 53: The apparatus of aspect 46, where outputting the indication of the one or more SRS resource sets associated with the SRS for the uplink transmission further includes: outputting an indication of a single SRS resource set associated with the SRS for the uplink transmission, the single SRS resource set including multiple SRS resources, where the multiple SRS resources in the single SRS resource set are configurable with a dynamic number of SRS ports.

Aspect 54: The apparatus of aspect 53, where the UE is capable of a single active uplink panel, and where outputting the control signaling indicating the first panel of the set of asymmetric panels further includes: outputting signaling indicating a number of SRS ports for the multiple SRS resources in the single SRS resource set, where obtaining the uplink transmission via the first panel of the UE is a result of the number of SRS ports being indicated for the multiple SRS resources in the single SRS resource set.

Aspect 55: The apparatus of aspect 53, where the UE is capable of two active uplink panels, and the first interface or the second interface is further configured to: output an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 56: The apparatus of aspect 55, where outputting the control signaling indicating the first panel of the set of asymmetric panels further includes: outputting an SRI indicating the first SRS resource associated with the first number of SRS ports, where obtaining the uplink transmission via the first panel of the UE is a result of the SRI indicating the first SRS resource associated with the first number of SRS ports.

Aspect 57: The apparatus of any of aspects 55 or 56, where outputting the control signaling indicating the first panel of the set of asymmetric panels further includes: outputting an indication of a TCI state associated with the first SRS resource, where obtaining the uplink transmission via the first panel of the UE is a result of outputting the indication of the TCI state associated with the first SRS resource.

Aspect 58: The apparatus of any of aspects 46-57, where outputting the control signaling indicating the first panel of the set of asymmetric panels further includes: outputting spatial relation information for a reference signal associated with the first panel, where obtaining the uplink transmission via the first panel of the UE is a result of outputting the spatial relation information for the reference signal associated with the first panel.

Aspect 59: The apparatus of any of aspects 46-58, where outputting the control signaling indicating the first panel of the set of asymmetric panels further includes: outputting an identifier associated with the first panel via scheduling information, where obtaining the uplink transmission via the first panel of the UE is a result of outputting the identifier associated with the first panel via the scheduling information.

Aspect 60: The apparatus of any of aspects 46-59, where the first interface or the second interface is further configured to: obtain a UE capability report indicating a respective upper limit of SRS ports for each panel of the set of asymmetric panels of the UE and an upper limit of active panels that the UE is capable of supporting, where outputting the control signaling indicating the first panel of the set of asymmetric panels is in accordance with the UE capability report.

Aspect 61: An apparatus for wireless communication at a UE, including: means for receiving an indication of one or more SRS resource sets associated with an SRS for an uplink transmission; means for receiving control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; means for selecting, from the set of asymmetric panels of the UE, the first panel in accordance with the control signaling; and means for performing the uplink transmission via the first panel.

Aspect 62: The apparatus of aspect 61, where the means for receiving the indication of the one or more SRS resource sets associated with the SRS for the uplink transmission further include: means for receiving an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 63: The apparatus of aspect 62, where the UE is capable of a single active uplink panel and a single valid SRS resource set, and where the means for receiving the control signaling indicating the first panel of the set of asymmetric panels further include: means for receiving signaling indicating the first SRS resource set as a valid SRS resource set, where selecting the first panel is a result of the first SRS resource set being the valid SRS resource set.

Aspect 64: The apparatus of aspect 63, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 65: The apparatus of aspect 62, where the UE is capable of two active uplink panels and two valid SRS resource sets, and where the means for receiving the control signaling indicating the first panel of the set of asymmetric panels further include: means for receiving signaling dynamically indicating the first SRS resource set as a selected SRS resource set, where selecting the first panel is a result of the first SRS resource set being indicated as the selected SRS resource set.

Aspect 66: The apparatus of aspect 65, where the means for receiving the signaling dynamically indicating the first SRS resource set as the selected SRS resource set further include: means for receiving an SRS resource set identifier corresponding to the first SRS resource set via DCI.

Aspect 67: The apparatus of any of aspects 65 or 66, where the means for receiving the signaling dynamically indicating the first SRS resource set as the selected SRS resource set further include: means for receiving an indication of a transmission configuration indicator (TCI) state associated with the first SRS resource set.

Aspect 68: The apparatus of aspect 61, where the means for receiving the indication of the one or more SRS resource sets associated with the SRS for the uplink transmission further include: means for receiving an indication of a single SRS resource set associated with the SRS for the uplink transmission, the single SRS resource set including multiple SRS resources, where the multiple SRS resources in the single SRS resource set are configurable with a dynamic number of SRS ports.

Aspect 69: The apparatus of aspect 68, where the UE is capable of a single active uplink panel, and where the means for receiving the control signaling indicating the first panel of the set of asymmetric panels further include: means for receiving signaling indicating a number of SRS ports for the multiple SRS resources in the single SRS resource set, where selecting the first panel is a result of the number of SRS ports being indicated for the multiple SRS resources in the single SRS resource set.

Aspect 70: The apparatus of aspect 68, where the UE is capable of two active uplink panels, further including: means for receiving an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 71: The apparatus of aspect 70, where the means for receiving the control signaling indicating the first panel of the set of asymmetric panels further include: means for receiving an SRI indicating the first SRS resource associated with the first number of SRS ports, where selecting the first panel is a result of the SRI indicating the first SRS resource associated with the first number of SRS ports.

Aspect 72: The apparatus of any of aspects 70 or 71, where the means for receiving the control signaling indicating the first panel of the set of asymmetric panels further include: means for receiving an indication of a TCI state associated with the first SRS resource, where selecting the first panel is a result of receiving the indication of the TCI state associated with the first SRS resource.

Aspect 73: The apparatus of any of aspects 61-72, where the means for receiving the control signaling indicating the first panel of the set of asymmetric panels further include: means for receiving spatial relation information for a reference signal associated with the first panel, where selecting the first panel is a result of receiving the spatial relation information for the reference signal associated with the first panel.

Aspect 74: The apparatus of any of aspects 61-73, where the means for receiving the control signaling indicating the first panel of the set of asymmetric panels further include: means for receiving an identifier associated with the first panel via scheduling information, where selecting the first panel is a result of receiving the identifier associated with the first panel via the scheduling information.

Aspect 75: The apparatus of any of aspects 61-74, further including: means for transmitting a UE capability report indicating a respective upper limit of SRS ports for each panel of the set of asymmetric panels of the UE and an upper limit of active panels that the UE is capable of supporting, where receiving the control signaling indicating the first panel of the set of asymmetric panels is in accordance with the UE capability report.

Aspect 76: A apparatus for wireless communication at a network entity, including: means for transmitting, to a UE, an indication of one or more SRS resource sets associated with an SRS for an uplink transmission; means for transmitting, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; and means for receiving, from the UE, the uplink transmission via the first panel of the UE.

Aspect 77: The apparatus of aspect 76, where the means for transmitting the indication of the one or more SRS resource sets associated with the SRS for the uplink transmission further include: means for transmitting an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 78: The apparatus of aspect 77, where the UE is capable of a single active uplink panel and a single valid SRS resource set, and where the means for transmitting the control signaling indicating the first panel of the set of asymmetric panels further include: means for transmitting signaling indicating the first SRS resource set as a valid SRS resource set, where receiving the uplink transmission via the first panel of the UE is a result of the first SRS resource set being the valid SRS resource set.

Aspect 79: The apparatus of aspect 78, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 80: The apparatus of aspect 77, where the UE is capable of two active uplink panels and two valid SRS resource sets, and where the means for transmitting the control signaling indicating the first panel of the set of asymmetric panels further include: means for transmitting signaling dynamically indicating the first SRS resource set as a selected SRS resource set, where receiving the uplink transmission via the first panel of the UE is a result of the first SRS resource set being indicated as the selected SRS resource set.

Aspect 81: The apparatus of aspect 80, where the means for transmitting the signaling dynamically indicating the first SRS resource set as the selected SRS resource set further include: means for transmitting an SRS resource set identifier corresponding to the first SRS resource set via DCI.

Aspect 82: The apparatus of any of aspects 80 or 81, where the means for transmitting the signaling dynamically indicating the first SRS resource set as the selected SRS resource set further include: means for transmitting an indication of a TCI state associated with the first SRS resource set.

Aspect 83: The apparatus of aspect 76, where the means for transmitting the indication of the one or more SRS resource sets associated with the SRS for the uplink transmission further include: means for transmitting an indication of a single SRS resource set associated with the SRS for the uplink transmission, the single SRS resource set including multiple SRS resources, where the multiple SRS resources in the single SRS resource set are configurable with a dynamic number of SRS ports.

Aspect 84: The apparatus of aspect 83, where the UE is capable of a single active uplink panel, and where the means for transmitting the control signaling indicating the first panel of the set of asymmetric panels further include: means for transmitting signaling indicating a number of SRS ports for the multiple SRS resources in the single SRS resource set, where receiving the uplink transmission via the first panel of the UE is a result of the number of SRS ports being indicated for the multiple SRS resources in the single SRS resource set.

Aspect 85: The apparatus of aspect 83, where the UE is capable of two active uplink panels, the apparatus further including: means for transmitting an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 86: The apparatus of aspect 85, where the means for transmitting the control signaling indicating the first panel of the set of asymmetric panels further include: means for transmitting an SRI indicating the first SRS resource associated with the first number of SRS ports, where receiving the uplink transmission via the first panel of the UE is a result of the SRI indicating the first SRS resource associated with the first number of SRS ports.

Aspect 87: The apparatus of any of aspects 85 or 86, where the means for transmitting the control signaling indicating the first panel of the set of asymmetric panels further include: means for transmitting an indication of a TCI state associated with the first SRS resource, where receiving the uplink transmission via the first panel of the UE is a result of transmitting the indication of the TCI state associated with the first SRS resource.

Aspect 88: The apparatus of any of aspects 76-87, where the means for transmitting the control signaling indicating the first panel of the set of asymmetric panels further include: means for transmitting spatial relation information for a reference signal associated with the first panel, where receiving the uplink transmission via the first panel of the UE is a result of transmitting the spatial relation information for the reference signal associated with the first panel.

Aspect 89: The apparatus of any of aspects 76-88, where the means for transmitting the control signaling indicating the first panel of the set of asymmetric panels further include: means for transmitting an identifier associated with the first panel via scheduling information, where receiving the uplink transmission via the first panel of the UE is a result of transmitting the identifier associated with the first panel via the scheduling information.

Aspect 90: The apparatus of any of aspects 76-89, further including: means for receiving a UE capability report indicating a respective upper limit of SRS ports for each panel of the set of asymmetric panels of the UE and an upper limit of active panels that the UE is capable of supporting, where transmitting the control signaling indicating the first panel of the set of asymmetric panels is in accordance with the UE capability report.

Aspect 91: A non-transitory computer-readable medium storing code for wireless communication at a UE, the code including instructions executable by a processor to receive an indication of one or more SRS resource sets associated with an SRS for an uplink transmission; receive control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; select, from the set of asymmetric panels of the UE, the first panel in accordance with the control signaling; and perform the uplink transmission via the first panel.

Aspect 92: The non-transitory computer-readable medium of aspect 91, where the instructions to receive the indication of the one or more SRS resource sets associated with the SRS for the uplink transmission are further executable by the processor to: receive an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 93: The non-transitory computer-readable medium of aspect 92, where the UE is capable of a single active uplink panel and a single valid SRS resource set, and where the instructions to receive the control signaling indicating the first panel of the set of asymmetric panels are further executable by the processor to: receive signaling indicating the first SRS resource set as a valid SRS resource set, where selecting the first panel is a result of the first SRS resource set being the valid SRS resource set.

Aspect 94: The non-transitory computer-readable medium of aspect 93, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 95: The non-transitory computer-readable medium of aspect 92, where the UE is capable of two active uplink panels and two valid SRS resource sets, and where the instructions to receive the control signaling indicating the first panel of the set of asymmetric panels are further executable by the processor to: receive signaling dynamically indicating the first SRS resource set as a selected SRS resource set, where selecting the first panel is a result of the first SRS resource set being indicated as the selected SRS resource set.

Aspect 96: The non-transitory computer-readable medium of aspect 95, where the instructions to receive the signaling dynamically indicating the first SRS resource set as the selected SRS resource set are further executable by the processor to: receive an SRS resource set identifier corresponding to the first SRS resource set via DCI.

Aspect 97: The non-transitory computer-readable medium of any of aspects 95 or 96, where the instructions to receive the signaling dynamically indicating the first SRS resource set as the selected SRS resource set are further executable by the processor to: receive an indication of a transmission configuration indicator (TCI) state associated with the first SRS resource set.

Aspect 98: The non-transitory computer-readable medium of aspect 91, where the instructions to receive the indication of the one or more SRS resource sets associated with the SRS for the uplink transmission are further executable by the processor to: receive an indication of a single SRS resource set associated with the SRS for the uplink transmission, the single SRS resource set including multiple SRS resources, where the multiple SRS resources in the single SRS resource set are configurable with a dynamic number of SRS ports.

Aspect 99: The non-transitory computer-readable medium of aspect 98, where the UE is capable of a single active uplink panel, and where the instructions to receive the control signaling indicating the first panel of the set of asymmetric panels are further executable by the processor to: receive signaling indicating a number of SRS ports for the multiple SRS resources in the single SRS resource set, where selecting the first panel is a result of the number of SRS ports being indicated for the multiple SRS resources in the single SRS resource set.

Aspect 100: The non-transitory computer-readable medium of aspect 98, where the UE is capable of two active uplink panels, and the instructions are further executable by the processor to: receive an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 101: The non-transitory computer-readable medium of aspect 100, where the instructions to receive the control signaling indicating the first panel of the set of asymmetric panels are further executable by the processor to: receive an SRI indicating the first SRS resource associated with the first number of SRS ports, where selecting the first panel is a result of the SRI indicating the first SRS resource associated with the first number of SRS ports.

Aspect 102: The non-transitory computer-readable medium of any of aspects 100 or 101, where the instructions to receive the control signaling indicating the first panel of the set of asymmetric panels are further executable by the processor to: receive an indication of a TCI state associated with the first SRS resource, where selecting the first panel is a result of receiving the indication of the TCI state associated with the first SRS resource.

Aspect 103: The non-transitory computer-readable medium of any of aspects 91-102, where the instructions to receive the control signaling indicating the first panel of the set of asymmetric panels are further executable by the processor to: receive spatial relation information for a reference signal associated with the first panel, where selecting the first panel is a result of receiving the spatial relation information for the reference signal associated with the first panel.

Aspect 104: The non-transitory computer-readable medium of any of aspects 91-103, where the instructions to receive the control signaling indicating the first panel of the set of asymmetric panels are further executable by the processor to: receive an identifier associated with the first panel via scheduling information, where selecting the first panel is a result of receiving the identifier associated with the first panel via the scheduling information.

Aspect 105: The non-transitory computer-readable medium of any of aspects 91-104, where the instructions are further executable by the processor to: transmit a UE capability report indicating a respective upper limit of SRS ports for each panel of the set of asymmetric panels of the UE and an upper limit of active panels that the UE is capable of supporting, where receiving the control signaling indicating the first panel of the set of asymmetric panels is in accordance with the UE capability report.

Aspect 106: A non-transitory computer-readable medium storing code for wireless communication at a network entity, the code including instructions executable by a processor to transmit, to a UE, an indication of one or more SRS resource sets associated with an SRS for an uplink transmission; transmit, to the UE, control signaling indicating a first panel of a set of asymmetric panels of the UE, the first panel indicated in accordance with a respective number of SRS ports associated with each panel of the set of asymmetric panels and the one or more SRS resource sets, where different panels of the set of asymmetric panels are associated with different numbers of SRS ports; and receive, from the UE, the uplink transmission via the first panel of the UE.

Aspect 107: The non-transitory computer-readable medium of aspect 106, where the instructions to transmit the indication of the one or more SRS resource sets associated with the SRS for the uplink transmission are further executable by the processor to: transmit an indication of two SRS resource sets associated with the SRS for the uplink transmission, where the two SRS resource sets include a first SRS resource set associated with a first number of SRS ports and a second SRS resource set associated with a second number of SRS ports, the first SRS resource set associated with the first panel of the set of asymmetric panels and the second SRS resource set associated with a second panel of the set of asymmetric panels.

Aspect 108: The non-transitory computer-readable medium of aspect 107, where the UE is capable of a single active uplink panel and a single valid SRS resource set, and where the instructions to transmit the control signaling indicating the first panel of the set of asymmetric panels are further executable by the processor to: transmit signaling indicating the first SRS resource set as a valid SRS resource set, where receiving the uplink transmission via the first panel of the UE is a result of the first SRS resource set being the valid SRS resource set.

Aspect 109: The non-transitory computer-readable medium of aspect 108, where the signaling indicating the first SRS resource set as the valid SRS resource set includes: signaling activating a TCI state associated with the first SRS resource set; MAC-CE signaling explicitly activating the first SRS resource set; or MAC-CE signaling explicitly activating an SRI field or an SRS resource set selection field in DCI corresponding to the first SRS resource set.

Aspect 110: The non-transitory computer-readable medium of aspect 107, where the UE is capable of two active uplink panels and two valid SRS resource sets, and where the instructions to transmit the control signaling indicating the first panel of the set of asymmetric panels are further executable by the processor to: transmit signaling dynamically indicating the first SRS resource set as a selected SRS resource set, where receiving the uplink transmission via the first panel of the UE is a result of the first SRS resource set being indicated as the selected SRS resource set.

Aspect 111: The non-transitory computer-readable medium of aspect 110, where the instructions to transmit the signaling dynamically indicating the first SRS resource set as the selected SRS resource set are further executable by the processor to: transmit an SRS resource set identifier corresponding to the first SRS resource set via DCI.

Aspect 112: The non-transitory computer-readable medium of any of aspects 110 or 111, where the instructions to transmit the signaling dynamically indicating the first SRS resource set as the selected SRS resource set are further executable by the processor to: transmit an indication of a TCI state associated with the first SRS resource set.

Aspect 113: The non-transitory computer-readable medium of aspect 106, where the instructions to transmit the indication of the one or more SRS resource sets associated with the SRS for the uplink transmission are further executable by the processor to: transmit an indication of a single SRS resource set associated with the SRS for the uplink transmission, the single SRS resource set including multiple SRS resources, where the multiple SRS resources in the single SRS resource set are configurable with a dynamic number of SRS ports.

Aspect 114: The non-transitory computer-readable medium of aspect 113, where the UE is capable of a single active uplink panel, and where the instructions to transmit the control signaling indicating the first panel of the set of asymmetric panels are further executable by the processor to: transmit signaling indicating a number of SRS ports for the multiple SRS resources in the single SRS resource set, where receiving the uplink transmission via the first panel of the UE is a result of the number of SRS ports being indicated for the multiple SRS resources in the single SRS resource set.

Aspect 115: The non-transitory computer-readable medium of aspect 113, where the UE is capable of two active uplink panels, and the instructions are further executable by the processor to: transmit an indication of two numbers of SRS ports for the multiple SRS resources in the single SRS resource set, the multiple SRS resources including at least a first SRS resource associated with a first number of SRS ports and a second SRS resource associated with a second number of SRS ports.

Aspect 116: The non-transitory computer-readable medium of aspect 115, where the instructions to transmit the control signaling indicating the first panel of the set of asymmetric panels are further executable by the processor to: transmit an SRI indicating the first SRS resource associated with the first number of SRS ports, where receiving the uplink transmission via the first panel of the UE is a result of the SRI indicating the first SRS resource associated with the first number of SRS ports.

Aspect 117: The non-transitory computer-readable medium of any of aspects 115 or 116, where the instructions to transmit the control signaling indicating the first panel of the set of asymmetric panels are further executable by the processor to: transmit an indication of a TCI state associated with the first SRS resource, where receiving the uplink transmission via the first panel of the UE is a result of transmitting the indication of the TCI state associated with the first SRS resource.

Aspect 118: The non-transitory computer-readable medium of any of aspects 106-117, where the instructions to transmit the control signaling indicating the first panel of the set of asymmetric panels are further executable by the processor to: transmit spatial relation information for a reference signal associated with the first panel, where receiving the uplink transmission via the first panel of the UE is a result of transmitting the spatial relation information for the reference signal associated with the first panel.

Aspect 119: The non-transitory computer-readable medium of any of aspects 106-118, where the instructions to transmit the control signaling indicating the first panel of the set of asymmetric panels are further executable by the processor to: transmit an identifier associated with the first panel via scheduling information, where receiving the uplink transmission via the first panel of the UE is a result of transmitting the identifier associated with the first panel via the scheduling information.

Aspect 120: The non-transitory computer-readable medium of any of aspects 106-119, where the instructions are further executable by the processor to: receive a UE capability report indicating a respective upper limit of SRS ports for each panel of the set of asymmetric panels of the UE and an upper limit of active panels that the UE is capable of supporting, where transmitting the control signaling indicating the first panel of the set of asymmetric panels is in accordance with the UE capability report.

As used herein, the term “determine” or “determining” encompasses a wide variety of actions and, therefore, “determining” can include calculating, computing, processing, deriving, investigating, looking up (such as via looking up in a table, a database or another data structure), ascertaining and the like. Also, “determining” can include receiving (such as receiving information), accessing (such as accessing data in a memory) and the like. Also, “determining” can include resolving, selecting, choosing, establishing and other such similar actions.

As used herein, a phrase referring to “at least one of” a list of items refers to any combination of those items, including single members. As an example, “at least one of: a, b, or c” is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:

a first interface configured to:

obtain an indication of one or more sounding reference signal (SRS) resource sets associated with an SRS for an uplink transmission; and obtain control signaling indicating a first panel of a set of asymmetric panels of the UE based at least in part on a first number of SRS ports associated with the first panel and the one or more SRS resource sets, wherein each panel of the set of asymmetric panels is associated with a respective number of SRS ports and wherein different panels of the set of asymmetric panels are associated with different numbers of SRS ports;

a processing system configured to:

select, from the set of asymmetric panels of the UE, the first panel in accordance with the control signaling; and the first interface or a second interface configured to:

output the uplink transmission via the first panel.

2. The apparatus of claim 1, wherein obtaining the indication of the one or more SRS resource sets associated with the SRS for the uplink transmission further comprises:

obtaining an indication of two SRS resource sets associated with the SRS for the uplink transmission, wherein the two SRS resource sets include a first SRS resource set associated with the first number of SRS ports and a second SRS resource set associated with a second number of SRS ports, the first SRS resource set associated with the first panel of the set of asymmetric panels and the second SRS resource set associated with a second panel of the set of asymmetric panels.

3. The apparatus of claim 2, wherein the UE is capable of a single active uplink panel and a single valid SRS resource set, and wherein obtaining the control signaling indicating the first panel of the set of asymmetric panels further comprises:

obtaining signaling indicating the first SRS resource set as a valid SRS resource set, wherein selecting the first panel is a result of the first SRS resource set being the valid SRS resource set.

4. The apparatus of claim 2, wherein the UE is capable of two active uplink panels and two valid SRS resource sets, and wherein obtaining the control signaling indicating the first panel of the set of asymmetric panels further comprises:

obtaining signaling dynamically indicating the first SRS resource set as a selected SRS resource set, wherein selecting the first panel is a result of the first SRS resource set being indicated as the selected SRS resource set.

5. The apparatus of claim 4, wherein obtaining the signaling dynamically indicating the first SRS resource set as the selected SRS resource set further comprises:

obtaining an SRS resource set identifier corresponding to the first SRS resource set via downlink control information (DCI).

6. The apparatus of claim 4, wherein obtaining the signaling dynamically indicating the first SRS resource set as the selected SRS resource set further comprises:

obtaining an indication of a transmission configuration indicator (TCI) state associated with the first SRS resource set.

7. The apparatus of claim 1, wherein obtaining the indication of the one or more SRS resource sets associated with the SRS for the uplink transmission further comprises:

obtaining an indication of a single SRS resource set associated with the SRS for the uplink transmission, the single SRS resource set including multiple SRS resources, wherein the multiple SRS resources in the single SRS resource set are configurable with a dynamic number of SRS ports.

8. The apparatus of claim 7, wherein the UE is capable of a single active uplink panel, and wherein obtaining the control signaling indicating the first panel of the set of asymmetric panels further comprises:

obtaining signaling indicating a number of SRS ports for the multiple SRS resources in the single SRS resource set, wherein selecting the first panel is a result of the number of SRS ports being indicated for the multiple SRS resources in the single SRS resource set.

9. The apparatus of claim 7, wherein the UE is capable of two active uplink panels, and the first interface or the second interface is further configured to:

obtain an indication of two numbers of SRS ports for the multiple SRS resources in the single SRS resource set, the multiple SRS resources including at least a first SRS resource associated with the first number of SRS ports and a second SRS resource associated with a second number of SRS ports.

10. The apparatus of claim 9, wherein obtaining the control signaling indicating the first panel of the set of asymmetric panels further comprises:

obtaining an SRS resource indicator (SRI) indicating the first SRS resource associated with the first number of SRS ports, wherein selecting the first panel is a result of the SRI indicating the first SRS resource associated with the first number of SRS ports.

11. The apparatus of claim 9, wherein obtaining the control signaling indicating the first panel of the set of asymmetric panels further comprises:

obtaining an indication of a transmission configuration indicator (TCI) state associated with the first SRS resource, wherein selecting the first panel is a result of obtaining the indication of the TCI state associated with the first SRS resource.

12. The apparatus of claim 1, wherein obtaining the control signaling indicating the first panel of the set of asymmetric panels further comprises:

obtaining spatial relation information for a reference signal associated with the first panel, wherein selecting the first panel is a result of obtaining the spatial relation information for the reference signal associated with the first panel.

13. The apparatus of claim 1, wherein obtaining the control signaling indicating the first panel of the set of asymmetric panels further comprises:

obtaining an identifier associated with the first panel via scheduling information, wherein selecting the first panel is a result of obtaining the identifier associated with the first panel via the scheduling information.

14. The apparatus of claim 1, wherein the first interface or the second interface is further configured to:

output a UE capability report indicating a respective upper limit of SRS ports for each panel of the set of asymmetric panels of the UE and an upper limit of active panels that the UE is capable of supporting, wherein obtaining the control signaling indicating the first panel of the set of asymmetric panels is in accordance with the UE capability report.

15. An apparatus for wireless communication at a network entity, comprising:

a first interface configured to:

output, to a user equipment (UE), an indication of one or more sounding reference signal (SRS) resource sets associated with an SRS for an uplink transmission; and output, to the UE, control signaling indicating a first panel of a set of asymmetric panels of the UE based at least in part on a first number of SRS ports associated with the first panel and the one or more SRS resource sets, wherein each panel of the set of asymmetric panels is associated with a respective number of SRS ports and wherein different panels of the set of asymmetric panels are associated with different numbers of SRS ports; and the first interface or a second interface configured to:

obtain, from the UE, the uplink transmission via the first panel of the UE.

16. The apparatus of claim 15, wherein outputting the indication of the one or more SRS resource sets associated with the SRS for the uplink transmission further comprises:

outputting an indication of two SRS resource sets associated with the SRS for the uplink transmission, wherein the two SRS resource sets include a first SRS resource set associated with the first number of SRS ports and a second SRS resource set associated with a second number of SRS ports, the first SRS resource set associated with the first panel of the set of asymmetric panels and the second SRS resource set associated with a second panel of the set of asymmetric panels.

17. The apparatus of claim 16, wherein the UE is capable of a single active uplink panel and a single valid SRS resource set, and wherein outputting the control signaling indicating the first panel of the set of asymmetric panels further comprises:

outputting signaling indicating the first SRS resource set as a valid SRS resource set, wherein obtaining the uplink transmission via the first panel of the UE is a result of the first SRS resource set being the valid SRS resource set.

18. The apparatus of claim 16, wherein the UE is capable of two active uplink panels and two valid SRS resource sets, and wherein outputting the control signaling indicating the first panel of the set of asymmetric panels further comprises:

outputting signaling dynamically indicating the first SRS resource set as a selected SRS resource set, wherein obtaining the uplink transmission via the first panel of the UE is a result of the first SRS resource set being indicated as the selected SRS resource set.

19. The apparatus of claim 15, wherein outputting the indication of the one or more SRS resource sets associated with the SRS for the uplink transmission further comprises:

outputting an indication of a single SRS resource set associated with the SRS for the uplink transmission, the single SRS resource set including multiple SRS resources, wherein the multiple SRS resources in the single SRS resource set are configurable with a dynamic number of SRS ports.

20. The apparatus of claim 19, wherein the UE is capable of a single active uplink panel, and wherein outputting the control signaling indicating the first panel of the set of asymmetric panels further comprises:

outputting signaling indicating a number of SRS ports for the multiple SRS resources in the single SRS resource set, wherein obtaining the uplink transmission via the first panel of the UE is a result of the number of SRS ports being indicated for the multiple SRS resources in the single SRS resource set.

21. The apparatus of claim 19, wherein the UE is capable of two active uplink panels, and the first interface or the second interface is further configured to:

output an indication of two numbers of SRS ports for the multiple SRS resources in the single SRS resource set, the multiple SRS resources including at least a first SRS resource associated with the first number of SRS ports and a second SRS resource associated with a second number of SRS ports.

22. The apparatus of claim 21, wherein outputting the control signaling indicating the first panel of the set of asymmetric panels further comprises:

outputting an SRS resource indicator (SRI) indicating the first SRS resource associated with the first number of SRS ports, wherein obtaining the uplink transmission via the first panel of the UE is a result of the SRI indicating the first SRS resource associated with the first number of SRS ports.

23. The apparatus of claim 21, wherein outputting the control signaling indicating the first panel of the set of asymmetric panels further comprises:

outputting an indication of a transmission configuration indicator (TCI) state associated with the first SRS resource, wherein obtaining the uplink transmission via the first panel of the UE is a result of outputting the indication of the TCI state associated with the first SRS resource.

24. A method for wireless communication at a user equipment (UE), comprising:

receiving an indication of one or more sounding reference signal (SRS) resource sets associated with an SRS for an uplink transmission;

receiving control signaling indicating a first panel of a set of asymmetric panels of the UE based at least in part on a first number of SRS ports associated with the first panel and the one or more SRS resource sets, wherein each panel of the set of asymmetric panels is associated with a respective number of SRS ports and wherein different panels of the set of asymmetric panels are associated with different numbers of SRS ports;

selecting, from the set of asymmetric panels of the UE, the first panel in accordance with the control signaling; and performing the uplink transmission via the first panel.

25. The method of claim 24, wherein receiving the indication of the one or more SRS resource sets associated with the SRS for the uplink transmission further comprises:

receiving an indication of two SRS resource sets associated with the SRS for the uplink transmission, wherein the two SRS resource sets include a first SRS resource set associated with the first number of SRS ports and a second SRS resource set associated with a second number of SRS ports, the first SRS resource set associated with the first panel of the set of asymmetric panels and the second SRS resource set associated with a second panel of the set of asymmetric panels.

26. The method of claim 25, wherein the UE is capable of a single active uplink panel and a single valid SRS resource set, and wherein receiving the control signaling indicating the first panel of the set of asymmetric panels further comprises:

receiving signaling indicating the first SRS resource set as a valid SRS resource set, wherein selecting the first panel is a result of the first SRS resource set being the valid SRS resource set.

27. The method of claim 25, wherein the UE is capable of two active uplink panels and two valid SRS resource sets, and wherein receiving the control signaling indicating the first panel of the set of asymmetric panels further comprises:

receiving signaling dynamically indicating the first SRS resource set as a selected SRS resource set, wherein selecting the first panel is a result of the first SRS resource set being indicated as the selected SRS resource set.

28. A method for wireless communication at a network entity, comprising:

transmitting, to a user equipment (UE), an indication of one or more sounding reference signal (SRS) resource sets associated with an SRS for an uplink transmission;

transmitting, to the UE, control signaling indicating a first panel of a set of asymmetric panels of the UE based at least in part on a first number of SRS ports associated with the first panel and the one or more SRS resource sets, wherein each panel of the set of asymmetric panels is associated with a respective number of SRS ports and wherein different panels of the set of asymmetric panels are associated with different numbers of SRS ports; and receiving, from the UE, the uplink transmission via the first panel of the UE.

29. The method of claim 28, wherein transmitting the indication of the one or more SRS resource sets associated with the SRS for the uplink transmission further comprises:

transmitting an indication of two SRS resource sets associated with the SRS for the uplink transmission, wherein the two SRS resource sets include a first SRS resource set associated with the first number of SRS ports and a second SRS resource set associated with a second number of SRS ports, the first SRS resource set associated with the first panel of the set of asymmetric panels and the second SRS resource set associated with a second panel of the set of asymmetric panels.

30. The method of claim 29, wherein the UE is capable of a single active uplink panel and a single valid SRS resource set, and wherein transmitting the control signaling indicating the first panel of the set of asymmetric panels further comprises:

transmitting signaling indicating the first SRS resource set as a valid SRS resource set, wherein receiving the uplink transmission via the first panel of the UE is a result of the first SRS resource set being the valid SRS resource set.

* * * * *